United States Patent
Longinov et al.

(10) Patent No.: US 7,158,976 B1
(45) Date of Patent: Jan. 2, 2007

(54) SPATIAL DOMAIN MECHANISM

(75) Inventors: Vadim Longinov, Marlborough, MA (US); John Forecast, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 496 days.

(21) Appl. No.: 10/675,164

(22) Filed: Sep. 30, 2003

(51) Int. Cl.
*G06F 17/30* (2006.01)

(52) U.S. Cl. ....................................... 707/10

(58) Field of Classification Search ............. 707/1–10, 707/100–104.1, 200–206; 370/473
See application file for complete search history.

(56) References Cited

U.S. PATENT DOCUMENTS

| | | | |
|---|---|---|---|
| 5,206,939 A | 4/1993 | Yanai et al. | |
| 5,699,500 A | 12/1997 | Dasgupta | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,415,292 B1 | 7/2002 | Kamvysselis | |
| 6,445,717 B1* | 9/2002 | Gibson et al. | 370/473 |
| 6,681,228 B1* | 1/2004 | Balogh | 707/10 |
| 2003/0084039 A1* | 5/2003 | Balogh | 707/3 |

\* cited by examiner

*Primary Examiner*—Diane D. Mizrahi
(74) *Attorney, Agent, or Firm*—Muirhead & Saturnelli, LLC

(57) ABSTRACT

Transferring data from at least one local data storage device to at least one remote data storage device includes subdividing the data into portions, assigning a sequence number to each of the portions, where writes to the at least one local storage device for a first set of portions having a first sequence number are begun before writes for a second set of portions having a second sequence number that is assigned after to the first sequence number, and updating the sequence number in response to a particular sequence number having been used before and there being data to send from the at least one local storage device to the at least one remote storage device. The at least one local storage device may include a plurality of storage entities that form a consistency group.

20 Claims, 16 Drawing Sheets

SPATIAL DOMAIN MECHANISM

BACKGROUND OF THE INVENTION

1. Technical Field

This application relates to computer storage devices, and more particularly to communication between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" is coupled to the host. One or more other storage devices, called "secondary storage devices" receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link. The RDF functionality may be facilitated with an RDF adapter (RA) provided at each of the storage devices.

RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device.

A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

It is also possible to use RDF in a semi-synchronous mode, in which case the data is written from the host to the primary storage device which acknowledges the write immediately and then, at the same time, begins the process of transferring the data to the secondary storage device. Thus, for a single transfer of data, this scheme overcomes some of the disadvantages of using RDF in the synchronous mode. However, for data integrity purposes, the semi-synchronous transfer mode does not allow the primary storage device to transfer data to the secondary storage device until a previous transfer is acknowledged by the secondary storage device. Thus, the bottlenecks associated with using RDF in the synchronous mode are simply delayed by one iteration because transfer of a second amount of data cannot occur until transfer of previous data has been acknowledged by the secondary storage device.

Another possibility is to have the host write data to the primary storage device in asynchronous mode and have the primary storage device copy data to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate the latency problem associated with synchronous and semi-synchronous data transfer modes, a difficulty still exists because there can not be a guarantee of data consistency between the primary and secondary storage devices. If there are problems, such as a failure of the primary system, the secondary system may end up with out-of-order changes that make the data unusable. Note that there could also be consistency problems for semi-synchronous data transfers as well.

Thus, it would be desirable to have an RDF system that exhibits some of the beneficial qualities of each of the different techniques discussed above without the drawbacks. Such a system would exhibit low latency for each host write regardless of the distance between the primary and the secondary and would provide consistency (recoverability) of the secondary in case of failure. A system that addresses these issues is described in U.S. Pat. No. 6,415,292 issued on Jul. 2, 2002 (the '292 patent), which is incorporated by reference herein. The '292 patent describes a shuttle mechanism for providing sequence numbers that are used in connection with ordered writes from the primary storage device to the secondary storage device. However, in the system described in the '292 patent, the sequence numbers may be incremented even though there are no writes for a particular sequence number, which may not be desirable in some cases. In addition, in some instances, failure of a device responsible for incrementing the sequence number could cause non-optimal results. Accordingly, it is desirable to provide a system that addresses the issues presented by the system disclosed in the '292 patent.

SUMMARY OF THE INVENTION

According to the present invention, transferring data from at least one local data storage device to at least one remote data storage device includes subdividing the data into portions, assigning a sequence number to each of the portions, where writes to the at least one local storage device for a first set of portions having a first sequence number are begun before writes for a second set of portions having a second sequence number that is assigned after to the first sequence number, and updating the sequence number in response to a particular sequence number having been used before and there being data to send from the at least one local storage device to the at least one remote storage device. The at least one local storage device may include a plurality of storage entities that form a consistency group. Transferring data from at least one local data storage device to at least one remote data storage device may also include passing a shuttle between the entities of the consistency group and using the shuttle to determine if a particular sequence number has been used before. Updating the sequence number may include a particular one of the entities of the consistency group using the shuttle to determine if the particular one of the entities has used the particular sequence number before and, if so, the particular one of the entities updating the sequence number in response to the particular one of the entities having data to be sent to the at least one remote storage device. Transferring data from at least one local data storage device to at least one remote data storage device may also include maintaining a running total of an amount of data associated with each of the sequence numbers. At least one local storage device may include a plurality of storage entities that form a consistency group. Transferring data from at least one local data storage device to at least one remote data storage device may also include passing a shuttle between the entities of the consistency group and using the shuttle for maintaining the running total of data associated with each of the sequence numbers. Updating the sequence number may also includes a particular one of the entities of the consistency group using the shuttle to determine if the particular one of the entities has used the particular sequence number before and, if so, the particular one of the entities updating the sequence number in response to the particular one of the entities having data to be sent to the at least one remote storage device. Transferring data from at least one local data storage device to at least one remote data storage device may also include following updating the sequence number, transferring data having a previous sequence number from the at least one local storage device to the at least one remote storage device. Transferring data from at least one local data storage device to at least one remote data storage device may also include, prior to transferring data, buffering the data in an auxiliary storage area associated with the at least one local storage device.

According further to the present invention, a computer program product that transfers data from at least one local data storage device to at least one remote data storage device includes executable code that maintains the data subdivided into portions, executable code that assigns a sequence number to each of the portions, where writes to the at least one local storage device for a first set of portions having a first sequence number are begun before writes for a second set of portions having a second sequence number that is assigned after to the first sequence number, and executable code that updates the sequence number in response to a particular sequence number having been used before and there being data to send from the at least one local storage device to the at least one remote storage device. The at least one local storage device may include a plurality of storage entities that form a consistency group. The computer program product may also include executable code that passes a shuttle between the entities of the consistency group and executable code that uses the shuttle to determine if a particular sequence number has been used before. Executable code that updates the sequence number may include executable code that causes a particular one of the entities of the consistency group using the shuttle to determine if the particular one of the entities has used the particular sequence number before and, if so, causes the particular one of the entities to update the sequence number in response to the particular one of the entities having data to be sent to the at least one remote storage device. The computer program product may also include executable code that maintains a running total of an amount of data associated with each of the sequence numbers. The at least one local storage device may include a plurality of storage entities that form a consistency group. The computer program product may also include executable code that passes a shuttle between the entities of the consistency group and executable code that uses the shuttle for maintaining the running total of data associated with each of the sequence numbers. Executable code that updates the sequence number may include executable code that causes a particular one of the entities of the consistency group using the shuttle to determine if the particular one of the entities has used the particular sequence number before and, if so, causes the particular one of the entities updating the sequence number in response to the particular one of the entities having data to be sent to the at least one remote storage device. The computer program product may also include executable code that transfers data having a previous sequence number from the at least one local storage device to the at least one remote storage device following updating the sequence number. The computer program product may also include executable code that buffers the data in an auxiliary storage area associated with the at least one local storage device prior to transferring data.

DETAILED DESCRIPTION OF VARIOUS EMBODIMENTS

Figure 1:
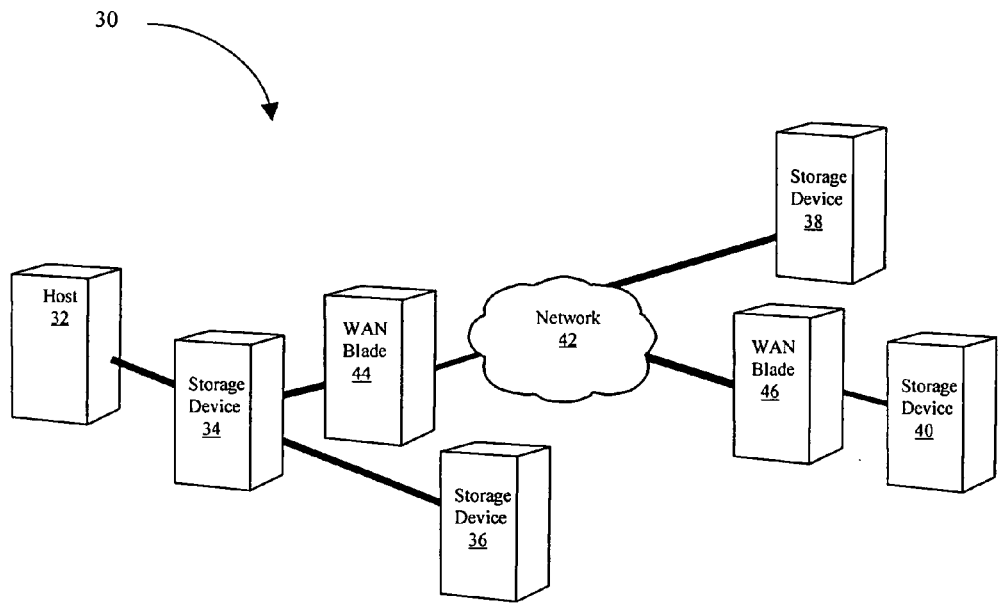
FIG. 1 is a schematic diagram showing a plurality of storage devices, WAN blades, a network and a host.

Referring to FIG. 1, a system 30 includes a host 32 coupled to a first storage device 34. The system 30 also includes a second storage device 36, a third storage device 38 and a fourth storage device 40. The number of storage devices shown for the system 30 is exemplary only and is used to illustrate the system described herein. As may be appreciated by one of ordinary skill in the art, the system 30 may be implemented using any numbers of storage devices interconnected in a variety of manners.

The storage devices 34, 36, 38, 40 may communicate using, for example, the RDF protocol, which is described in U.S. Pat. No. 5,742,792, which is incorporated by reference herein. Some of the storage devices 34, 36, 38, 40 may be interconnected via a network 42. The network 42 may be any type of network such as a network that uses TCP/IP and/or UDP, the Internet, and/or hardwired interconnections. FIG. 1 also shows a first WAN blade 44 and a second WAN blade 46. As discussed in more detail elsewhere herein, the WAN blades 44, 46 may act as buffers for interconnections between the storage devices 34, 36, 38, 40 and, in some instances, may translate data from RDF format to or from another format and/or encrypt and decrypt the data and/or compress and decompress the data. The WAN blades 44, 46 may also simulate synchronous RDF communication or simulate other types of RDF communication, as discussed elsewhere herein. The WAN blades 44, 46 may be implemented as stand alone computers (such as computers containing Celeron processors) or may be implemented as plug in cards that are internal to a storage device or some other device. Generally, the WAN blades 44, 46 may be thought of as any buffer and/or translation and/or encryption capability that may be provided internally, externally, or some combination thereof to the storage devices.

FIG. 1 shows the storage device 34 coupled to the WAN blade 44 which is coupled to the network 42. The interconnection between the storage device 34 and the WAN blade 44 may be a conventional RDF connection. That is, the storage device 34 may be sending and receiving RDF data to and from the WAN blade 44 in a manner substantially similar, or identical, to the way in which the storage device 34 would send and receive RDF data to and from another storage device. Communication between the storage device 34 and the WAN blade 44 may be synchronous RDF, with the storage device 34 acting as the primary storage device for the host 32 and the WAN blade 44 simulating a secondary storage device. In that case, the WAN blade 44 could immediately acknowledge receipt of the data from the storage device 34 and then buffer the data for subsequent transmission over the network 42. In this way, the host 32 may receive a write acknowledgement before the data reaches its ultimate destination (a secondary storage device), thus overcoming some of the timing and throughput difficulties associated with synchronous RDF communication.

The storage device 34 may also be connected to the second storage device 36 via RDF. Thus, the first storage device 34 may be sending and receiving data to and from the WAN blade 44 using a first RDF connection and may be directly sending and receiving data to and from the second storage device 36 using another RDF connection and RDF data.

The WAN blade 44 may receive the RDF data from the first storage device 34 and convert the data to another format, such as UDP or TCP/IP, and then provide the data to the network 42. That is, the WAN blade 44 may receive RDF data from the storage device 34 and encapsulate the data into TCP/IP or UDP packets prior to providing the data to the network 42. Encapsulation may be provided in a conventional manner by, for example, storing the entirety of the RDF data (i.e., including control data) as the payload of a TCP/IP or UDP packet. In addition, the WAN blade 44 may compress and/or encrypt the data without significant performance penalty, since the WAN blade 44 may acknowledge receipt of the data prior to applying the compression and/or encryption (and prior to the data being acknowledged by the secondary storage device).

Note that, in the case of conventional synchronous RDF communication without a WAN blade (or equivalent), encryption, compression, and encapsulation may provide a significant performance penalty since the host does not receive a write acknowledge until the data is received at its ultimate destination (the secondary storage device), and thus encryption/decryption, compression/decompression, and/or encapsulation deencapsulation may increase the delay between the host writing data to the primary storage device and thus delay the host receiving a write acknowledge. With the WAN blade 44, on the other hand, the storage device 34 could receive an acknowledgement prior to the WAN blade 44 encrypting, encapsulation, and/or compressing the data, thus improving throughput.

The third storage device 38 may be connected directly to the network 42. If the network 42 is hardwired and/or in some other way transmits RDF data, then the RDF data may be provided directly from the network 42 to the third storage device 38. Alternatively, if the network 42 is used, for example, to transfer TCP/IP packets, then the network 42 may provide the TCP/IP packets to an internal WAN blade (not shown) of the third storage device 38. The second WAN blade 46 and the fourth storage device 40 may communicate using RDF. Thus, RDF data from the storage device 34 may be provided to the WAN blade 44 using RDF communication. The WAN blade 44 may then encapsulate the data in, for example, a TCP/IP packet and may also optionally encrypt and/or compress the data. The data may then be provided by the WAN blade 44 to the network 42. The data may then be transported over the network 42 until it is received by the WAN blade 46. The WAN blade 46 may then deencapsulate the data (and, as appropriate, decrypt and decompress the data) and provide the data, in an RDF format, to the fourth storage device 40. Note that the RDF connection between the second WAN blade 46 and the fourth storage device 40 may be synchronous RDF, just as with the first WAN blade 44 and the first storage device 34. Thus, the first storage device 34 and the fourth storage device 40 may communicate with each other using RDF format where the WAN blades 44, 46 are interposed there between and used to convert the data to and from a format that can be transmitted via the network 42 (and also optionally used to acknowledge synchronous RDF transmissions).

Data may be transferred from the fourth storage device 40 to the first storage device 34 in a manner similar to data being transferred from the first storage device 34 to the fourth storage device 40, described above. In that case, the fourth storage device 40 may provides RDF data to the WAN blade 46, which would then encapsulate the data in a format suitable for transmission over the network 42 (and possible encrypt and/or compress the data). The WAN blade 44 would then receive the data from the network 42 and would transmit the data in RDF format to the first storage device 34.

The WAN blades 44, 46 may also be used to purposefully delay sending of data. For example, if the storage device 34 is a primary storage device in an RDF group, the WAN blade 44 may be set up to delay sending data for a specific amount of time, such as sixty minutes. Thus, if changes are made to the data on the primary storage device 34 that are deemed unacceptable, it is possible to undo the changes by halting the (delayed) propagation of data to the secondary storage device and then copying the stored data from the secondary storage device back to the primary storage device. Also, in some instances, such as those described elsewhere herein, applications may be restarted on a secondary storage device by coupling a host thereto and converting the primary storage device to a secondary storage device for the host.

It is also possible to provide additional functionality to software on the WAN blades 44, 46 that may not be available in connection with RDF. For instance, the WAN blades 44, 46 could be programmed to recognize data according to files, file systems, host origin, etc. This additional information could then be used to intelligently handle the data, such as by allowing rapid file copying from one WAN blade to another.

Figure 2:
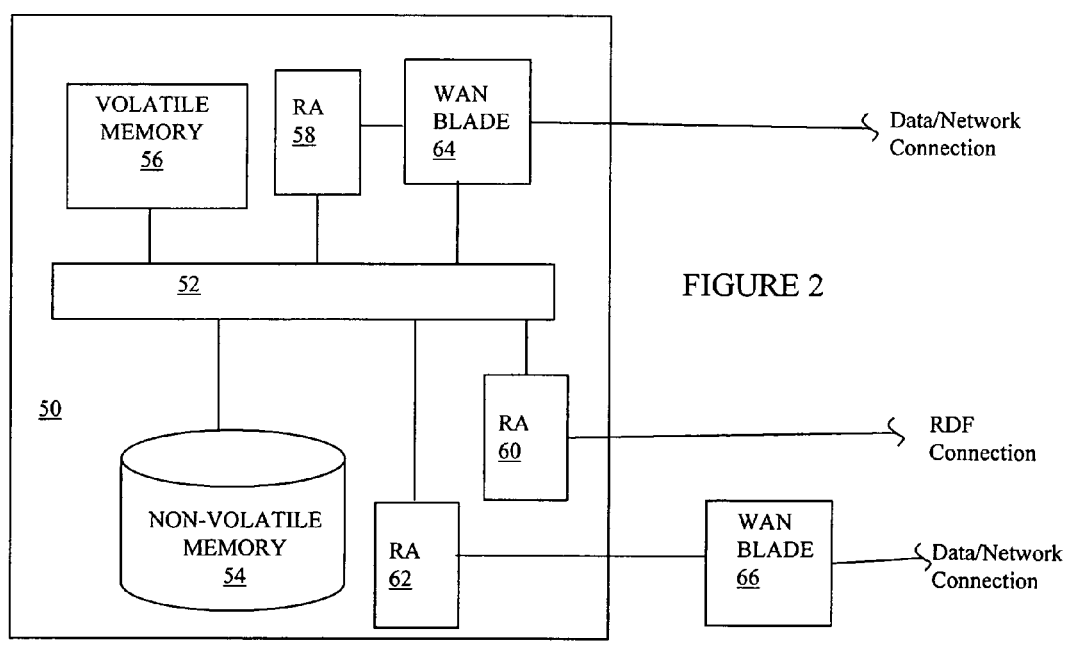
FIG. 2 is a schematic diagram illustrating a storage device that uses internal and external WAN blades.

Referring to FIG. 2, a schematic diagram illustrates a storage device 50 that may provide and receive data in various formats. The storage device 50 may include an internal bus or a matrix connect 52 having coupled thereto nonvolatile storage 54, volatile storage 56, and a plurality of RDF adapters (RA's) 58, 60, 62. Other devices that are not shown in FIG. 2 may also be coupled to the bus/matrix connect 52. Note that, in some cases, a matrix connect may support more multiple simultaneous data paths between components than a conventional bus but that a matrix connect may be more difficult/complex/costly to implement. One of the RA's 58 may be coupled to an internal WAN blade 64 that is internal to the storage device 50 and which may share some of the resources of the internal storage device 50, such as the power supply. The RA 58 may be coupled directly to the WAN blade 64 via, for example, an Ethernet connection or other type of appropriate connection. Alternatively, or in addition to coupling the WAN blade 54 directly to the RA 58, the RA 58 may communicate with the WAN blade 64 using the bus/matrix connect 52.

The RA 60 may provide a conventional RDF connection to another storage device. The RA 62 may be coupled to an external WAN blade 66 that sends and receives RDF data in an RDF format to and from the RA 62 while providing data in another format, or possibly the same format, using a data connection to, for example, a network. Note that the connections to the storage device 50 may be Fibre Channel, ESCON, or any other type of connection capable of supporting the functionality disclosed herein.

Figure 3:
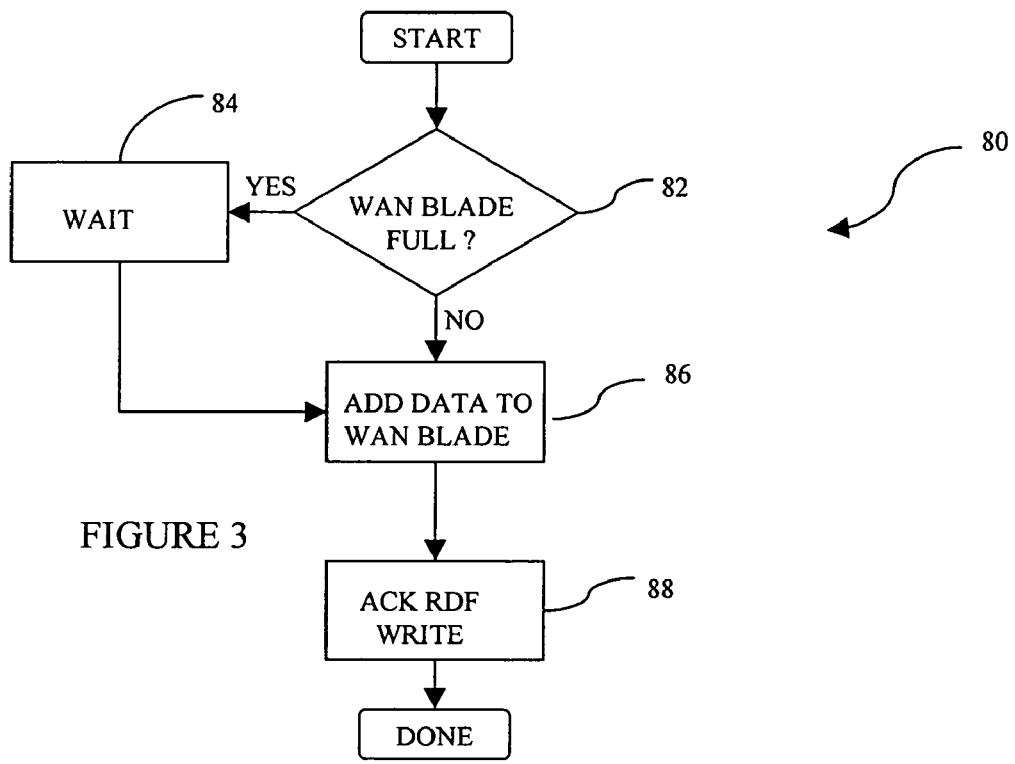
FIG. 3 is a flowchart illustrating steps for transferring data from a storage device to a WAN blade.

Referring to FIG. 3, a flowchart 80 illustrates steps for transferring data from a storage device to a WAN blade. Processing begins with a first test step 82 where it is determined if internal storage in the WAN blade is full (i.e., if the WAN blade has room to store the data). That is, it is determined at the test step 82 if the WAN blade to which the data is being transferred has room to store additional data. If it is determined at the test step 82 that the WAN blade is full, then control passes from the step 82 to a step 84 where the storage device is made to wait for room in the WAN blade. While the storage device is waiting for room, the WAN blade can simply reply to the request by the storage device to transfer data in a conventional RDF format indicating that the device to which the transfer is being made is not ready. In other embodiments, the WAN blade being full triggers error processing, discussed elsewhere herein.

Following the step 84, or following the test step 82 if it is determined that the WAN blade is not full, is a step 86 where the data is transferred to the WAN blade (the WAN blade sends appropriate RDF commands to accept the data). Following the step 86 is a step 88 where the WAN blade acknowledges the RDF write. Following the step 88, processing is complete.

Note that once data has been transferred to the WAN blade, it may be modified in a manner that is appropriate for the WAN blade to send the data. For example, the WAN blade may encapsulate the data in TCP/IP or UDP format. The WAN blade may also encrypt and/or compress the data.

Figure 4:
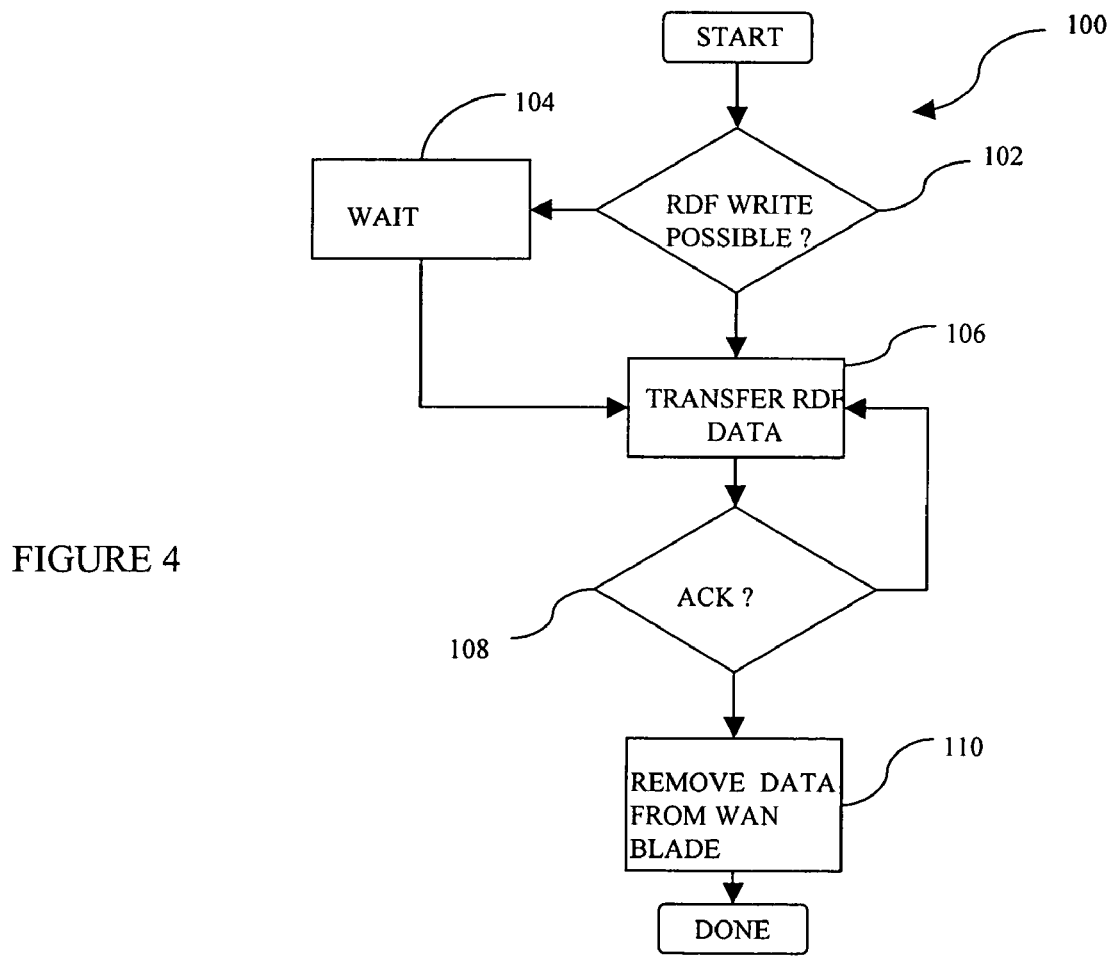
FIG. 4 is a flowchart illustrating steps performed in connection with transferring data from a WAN blade to a storage device.

Referring to FIG. 4, a flowchart 100 illustrates steps performed in connection with a WAN blade transferring data to a storage device. Processing begins in a first test step 102 where it is determined if an RDF write is possible. That is, the WAN blade determines if the storage device that is receiving the data is ready to accept an RDF write of the data. If not, then control transfers from the step 102 to a step 104 where the WAN blade waits for the storage device to be ready for the RDF write.

Following the step 104, or following the step 102 if the storage device is initially ready for an RDF write, is a step 106 where the RDF data is sent from the WAN blade to the storage device. As discussed elsewhere herein, the WAN blade sending the data to the storage device may appear to the storage device as a conventional RDF write. Following the step 106 is a test step 108 where it is determined if the storage device has acknowledged the write of the data from the WAN blade. If not, control transfers from the step 108 back to the step 106 where the WAN blade resends the data. The step 106 is followed by the test step 108 where it is determined if receipt is acknowledged. The steps 106, 108 represent the WAN blade sending and resending the data until the data is acknowledged by the storage device.

Note that it is possible to introduce more sophisticated processing where, for example, after a certain number of tries, such as three, an error is posted and the write operation is aborted. In such a case, it may be useful to not allow subsequent writes in order to preserve the integrity of the data. This is not shown explicitly in FIG. 4, but is understood by one of ordinary skill in the art that this may be implemented by providing additional steps in connection with the steps 106, 108. Once it is determined at the step 108 that the storage device acknowledges the write operation, control passes to a step 110 where the data that has been written from the WAN blade to the storage device is removed from the WAN blade. Following the step 110, processing is complete.

Note that, prior to the data being sent from the WAN blade to the storage device, the data may require preprocessing, which is not shown explicitly in FIG. 4. For example, if the data is provided to the WAN blade as a TCP/IP or UDP packet, the WAN blade may deencapsulate the data prior to sending the data to the storage device. Similarly, the WAN blade may need to decompress and/or decrypt the data.

Although FIGS. 3 and 4 illustrate transferring data between the WAN blades and storage devices, it is understood by one of skill in the art that the disclosed technique may be applied to transferring data between the WAN blades and a network and/or any other connection between the WAN blades, including a direct connection therebetween.

Transferring data to and from the WAN blades may be facilitated by using a journal to store data that is transmitted by a WAN blade and to store data that is received by a WAN blade. A journal may be volatile or non-volatile memory. A journal may be part of a corresponding WAN blade, part of a corresponding storage device, or may be separate from both the corresponding storage device and the corresponding WAN blade. Use and implementation of journals is discussed in more detail elsewhere herein.

Figure 5A:
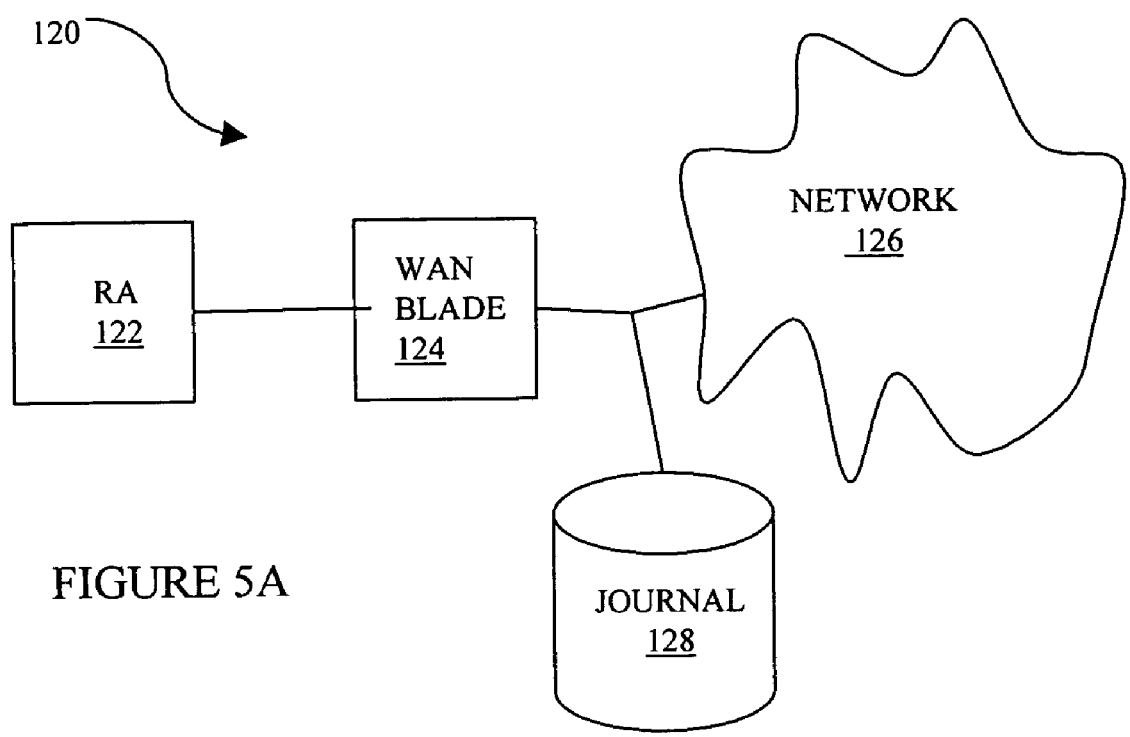
FIG. 5A is a schematic diagram illustrating a relationship between a WAN blade, a network and a journal.

Referring to FIG. 5A, a schematic diagram 120 illustrates an RA 122 coupled to a WAN blade 124 that is coupled to a network 126. A journal 128 is shown as being coupled to the connection between the WAN blade 124 and the network 126. The journal 128 is used for transferring data and for recovery, as discussed in more detail hereinafter.

Figure 5B:
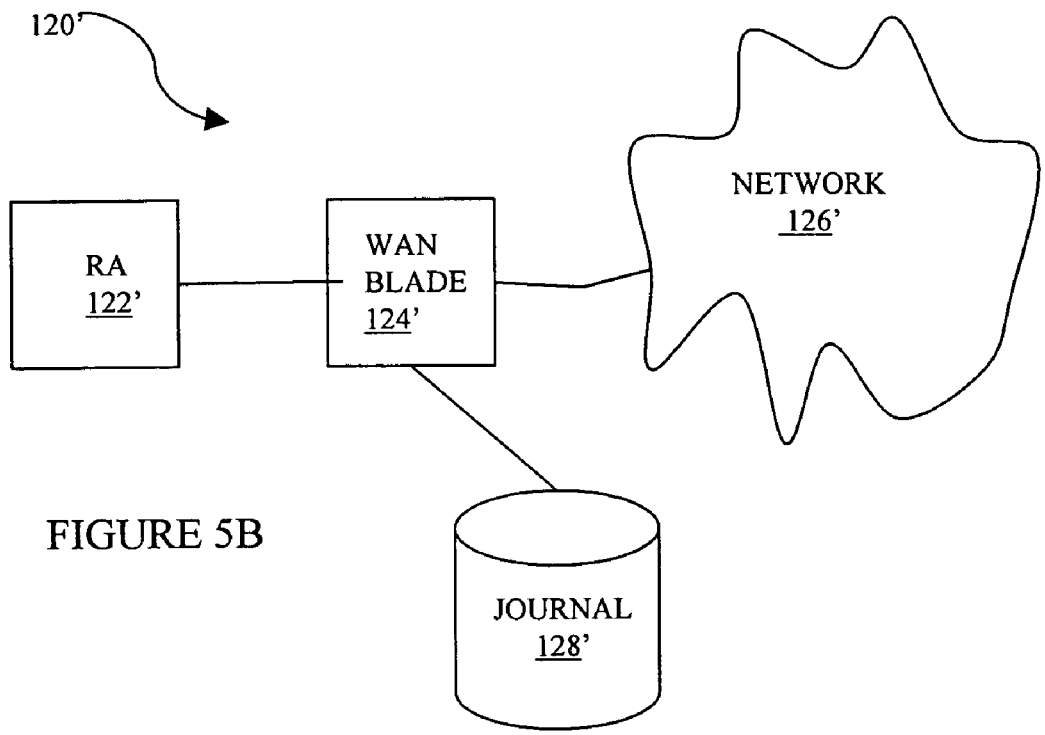
FIG. 5B is a schematic diagram illustrating a relationship between a WAN blade, a network and a journal.

Referring to FIG. 5B, a schematic diagram 120' illustrates an alternative journaling configuration where an RA 122' is coupled to a WAN blade 124' that is coupled to a network 126'. A journal 128' is shown as being coupled to the WAN blade 124'.

Figure 6:
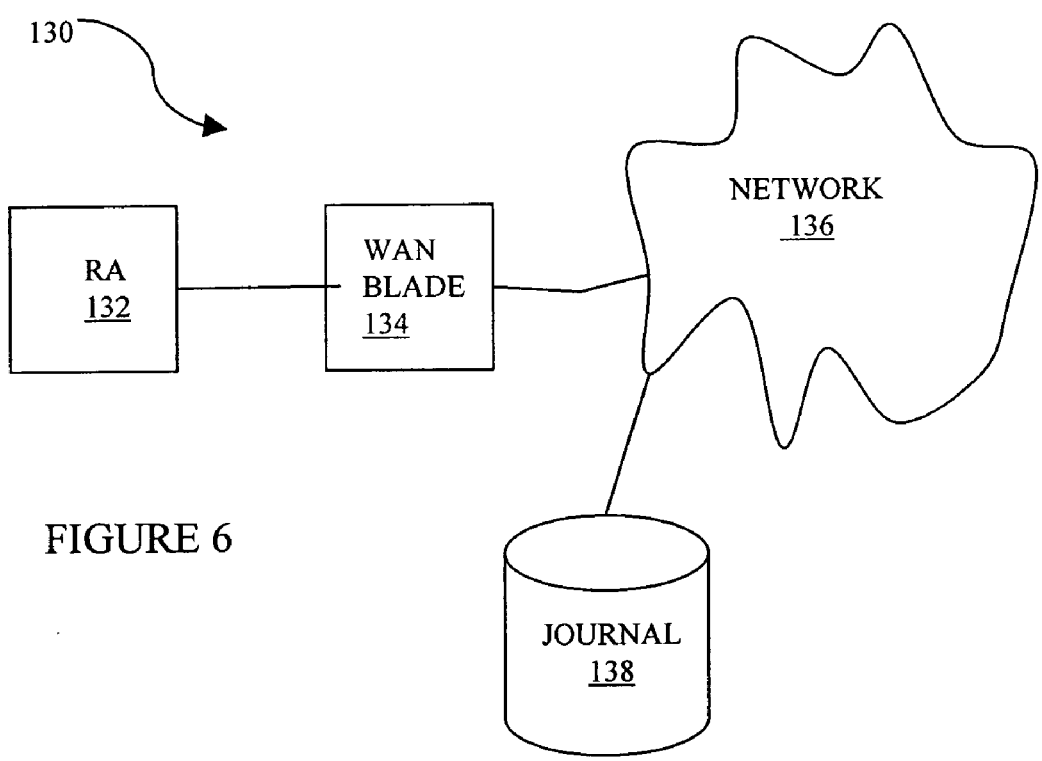
FIG. 6 is a schematic diagram illustrating a different relationship between a WAN blade, a network and a journal.

Referring to FIG. 6, an alternative journaling configuration is illustrated where an RA 132 is coupled to a WAN blade 134 which is coupled to a network 136. In the example of FIG. 6, a journal 138 is coupled to the network 136 rather than being coupled to the WAN blade 134 or to the connection between the WAN blade 134 and the network 136.

Figure 7:
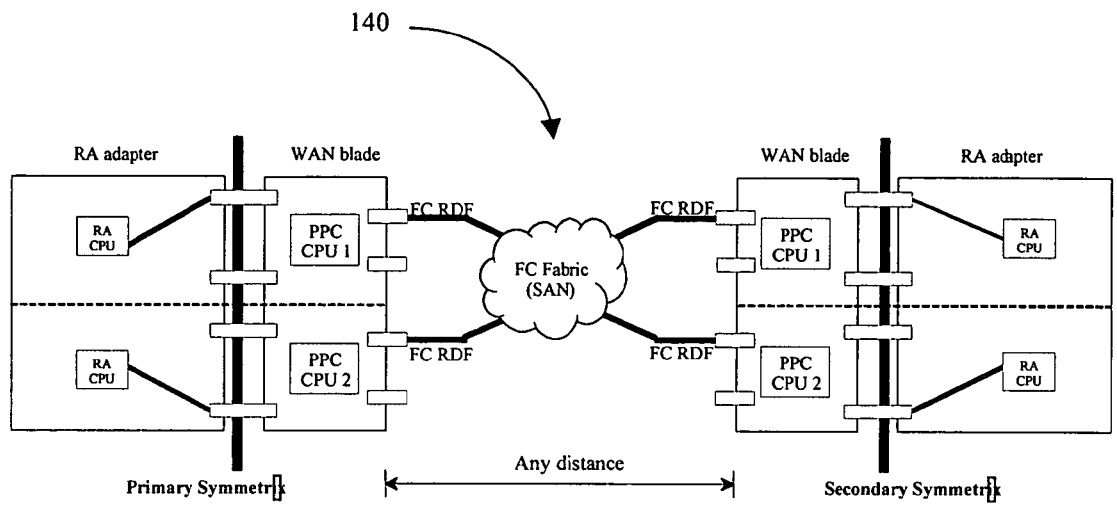
FIG. 7 is a schematic diagram showing a configuration for interconnecting WAN blades and storage devices over a network.

Referring to FIG. 7, a diagram 140 illustrates connections between RA adapters of a primary storage device (Primary Symmetrix), WAN blades, and RA adapters of a secondary storage device (Secondary Symmetrix). The SAN represents a storage area network for providing a data coupling between the primary and secondary storage devices. The diagram 140 illustrates one of many possible configurations that may be used to facilitate ordering the transfer of data between the primary storage device and the secondary storage device.

In conventional synchronous RDF, data is provided from the primary storage device to the secondary storage device in the same order that that data is provided by the host to the primary storage device. Thus, it is desirable to provide the data to a secondary storage device from a WAN blade coupled to the secondary device in the same order that the data was provided by a primary storage device to a WAN blade coupled to the primary storage device. In that way, the secondary storage device could receive the data in the same order that it was provided by the primary storage device. In addition, with appropriate use of journaling, as described hereinafter, recovery is facilitated if the data is provided to the secondary storage device in the order it was sent by the primary storage device.

In addition, in many instances, writes from a host to the primary storage device are dependent upon each other. For example, a host application copying data to a file may write a first block, wait for an acknowledgement for that write, then write a second block, etc. The host application does not write the second block unless and until the storage device acknowledges successful write of the first block. Thus, in a system that acknowledges write operations by the host prior to the data actually being successfully stored at the ultimate destination of the data (i.e., the secondary storage device) it is useful to be able to provide the data to the secondary storage device in the order that the data was written to the primary storage device by the host.

Figure 8:
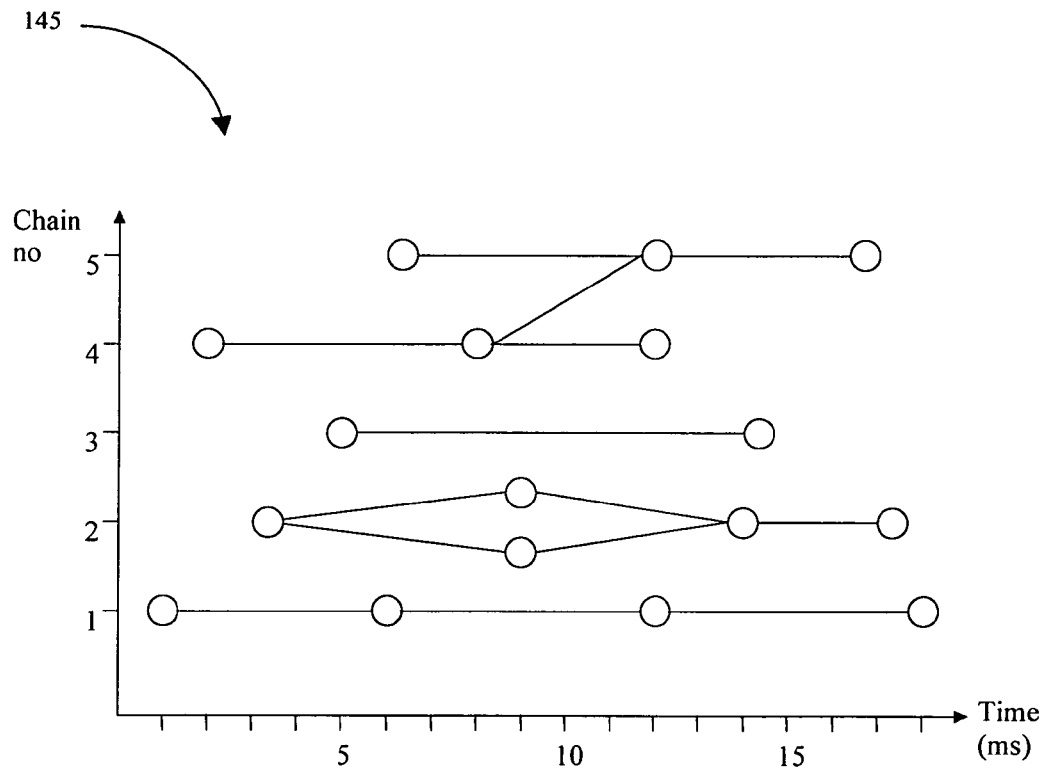
FIG. 8 is a schematic diagram illustrating dependent writes from a host to a storage device.

Referring to FIG. 8, a diagram 145 illustrates dependent writes for a plurality of "chains" of dependency. The vertical axis represents different chains of dependency. A first chain of dependency may be independent from a second chain of dependency because, for example, the chains correspond to different applications. Each write is represented by a circle. The horizontal axis represents time. The links between the circles represent dependency, going from left to right. Thus, for example, for chain number one in the diagram 145, the write at six ms is dependent upon the write at one ms being successfully completed first. Note, interestingly, that for two independent chains, the relative ordering of the writes is not necessarily critical. Thus, for example, the first write for each of the five chains shown in the diagram 145 may be provided to the secondary storage device(s) in a somewhat different order than that shown in the diagram 145.

Figure 9:
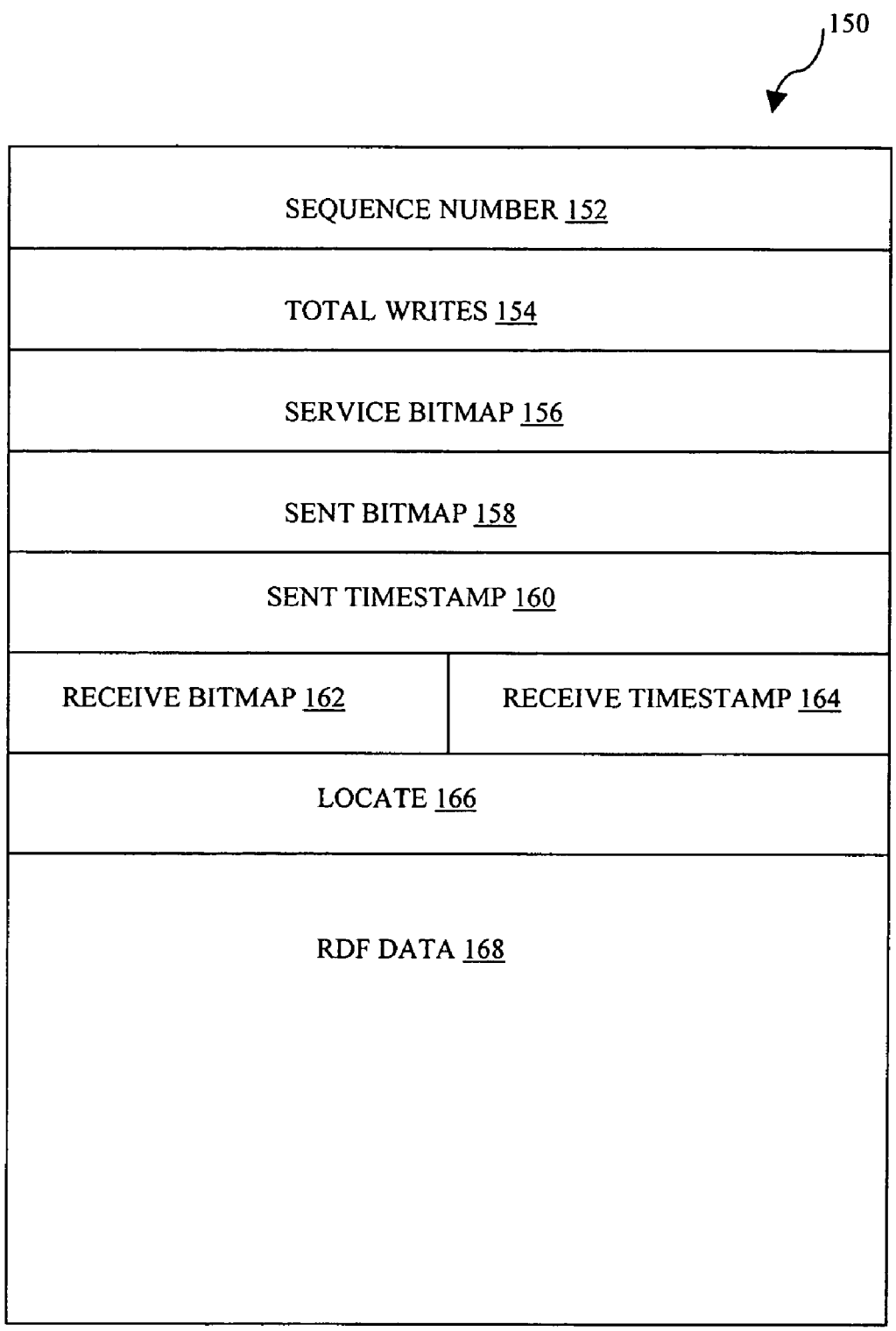
FIG. 9 is a schematic diagram illustrating a data structure used to send and receive data to and from WAN blades.

Referring to FIG. 9, a data structure 150 may be used to communicate data between primary WAN blades and secondary WAN blades. The data structure 150 includes a sequence number field 152 which is used to store a sequence number associated with each block of data corresponding to the data structure 150. The sequence number field 152 is used to sequentially order the data writes. As described in more detail below, the sequence number is periodically incremented so that the sequence number indicates the order of writes. Use of the sequence number field 152 is described in more detail below. The data structure 150 also includes a total writes field 154, a service bit map field 156, a sent bit map field 158, and a sent time stamp 160. The fields 154, 156, 158 and 160 are also described in more detail below.

The data structure 150 also includes a received bit map field 162 and a received time stamp field 164. In the embodiment disclosed herein, the received bit map field 162 is used by WAN blades in connection with data that is being sent and the received time stamp field 164 is used by WAN blades in connection with receiving data. Thus, the field 162 and the field 164 may overlap and may use the same location of the data structure 150 since the received bit map 162 is used by the WAN blades sending data and the received time stamp field 164 is used by the WAN blades receiving data.

The data structure 150 may also include a locate data field 166 and an RDF data field 168. The data fields 166, 168 correspond to RDF data that is sent in conventional fashion. Thus, the data structure 150 may be used to encapsulate information in the fields 166, 168 that is conventionally provided in connection with RDF communication. Note that the data structure 150 may be further encapsulated in another format, as appropriate, for whatever communication is being used between the WAN blades, such as transportation over networks. For example, if WAN blades are communicating using a TCP/IP network, than data stored in the data structure 150 may be encapsulated in a TCP/IP packet that may be constructed by the WAN blade sending the data and transported over the network where it is received by a receiving WAN blade that de-encapsulates the data to provide the data structure 150.

The total writes field 154 indicates the total number of writes corresponding to each of the sequence numbers.

Thus, for example, there may have been five instances of the data structure 150 written with the sequence number having a value of N. In that case, the data provided in the total writes field 154 would be five, indicating that there are five separate instances of data having sequence number N stored in the sequence number field 152.

The service bit map field 156 indicates the destinations of the data 150. It is possible for a WAN blade coupled to a primary storage device to need to write to multiple WAN blades coupled to secondary storage devices, especially in connection with servicing a consistency group having multiple storage devices and multiple WAN blades. The service bit map field 156 indicates which WAN blades are to receive the data 150. The service bit map field 156 may be implemented by having a bit position in the service bit map field 156 correspond to a particular one of the secondary WAN blades. Thus, for example, if there are eight (8) possible WAN blades that could be serviced, then bit position zero in the service bit map field 156 could indicate a first WAN blade, bit position one in the service bit map field 156 could indicate a second WAN blade, etc.

The sent bit map field 158 is used by a WAN blade coupled to a primary storage device and indicates which of the secondary WAN blades coupled to secondary storage devices have been sent the data 150. Note that when the value in the sent bit map field 158 equals the value in the service bit map field 156, then the data 150 has been sent by the WAN blade coupled to primary storage devices to all of the WAN blades coupled to secondary storage devices that receive data from the primary storage device.

The sent time stamp field 160 indicates the time that the data 150 has been sent. The sent time stamp field 160 may be used to implement a time out where, after a predetermined amount of time, the data 150 is deemed sufficiently old to be deleted from the WAN blade storage (journal), as described in more detail below. Other techniques for determining when to delete data from WAN blade storage are also discussed below.

The receive bit map field 162 may be used by WAN blade coupled to a primary storage device as an indication of which of the WAN blades coupled to secondary storage devices have acknowledged receipt of the data 150. Note that when the received bit map field 162 equals the service bit map 156, then all of the WAN blades coupled to secondary storage devices have received the data. The received bit map field 162 may also be set according to receipt of signals indicating that data has been successfully transferred to the secondary storage devices.

The received time stamp 164 is used by WAN blades coupled to secondary storage devices and is helpful to provide a time out mechanism. A WAN blade coupled to a secondary storage device may want to time out after a pre-determined amount of time has passed from when the data was received (as indicated by the received time stamp field 164) and when the data is acted upon.

The data 150 may be stored internally to the WAN blade or, if the WAN blade is part of the storage device, may be stored internally to the storage device. Alternatively, the data 150 may be stored as journal data, as set forth, for example, in connection with the journal data 128 of FIG. 5A, the journal data 128' of FIG. 5B, and/or the journal data 138 of FIG. 6. The journal data may be internal or external to the WAN blade and may or may not be stored on a storage device associated with the WAN blade.

Figure 10:
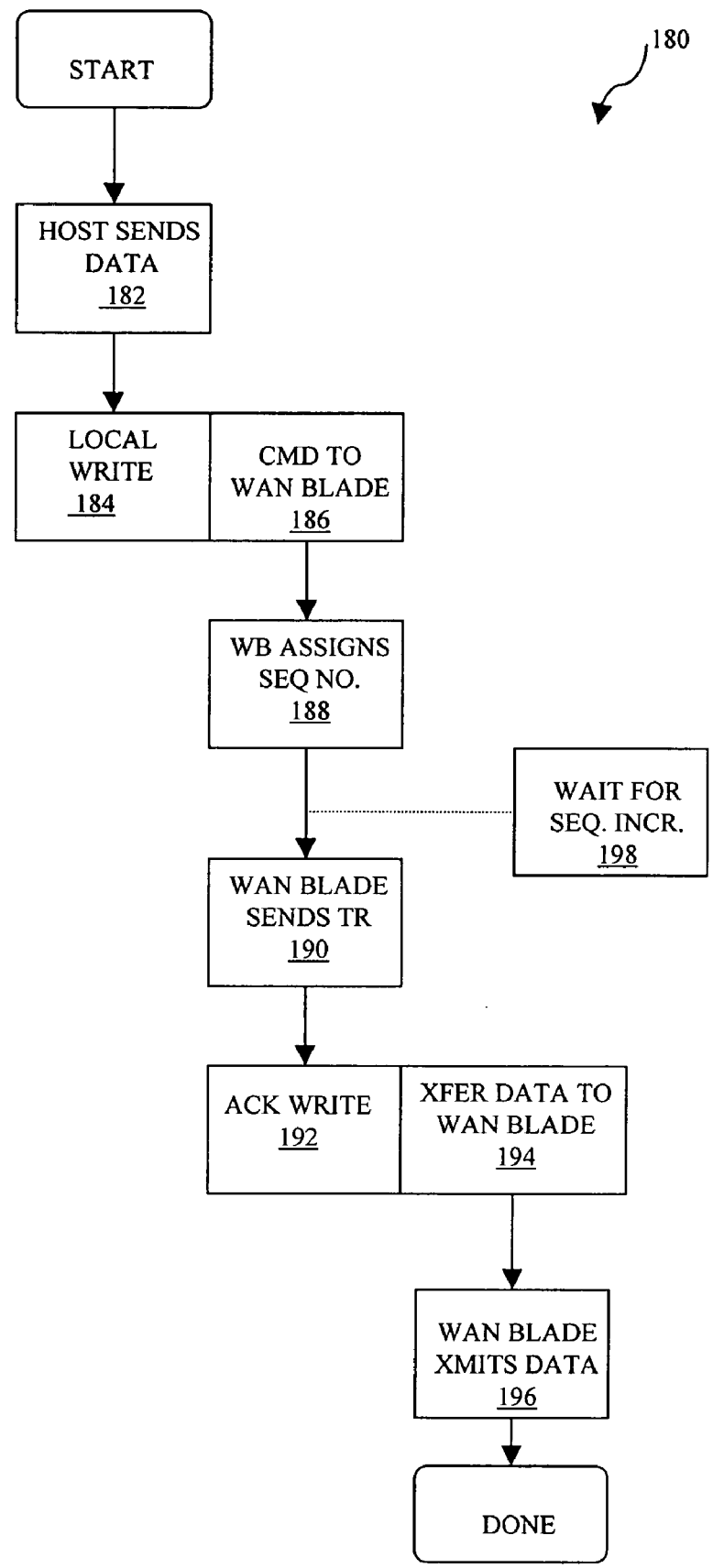
FIG. 10 is a flowchart illustrating steps performed in connection with transferring data to a WAN blade coupled to a primary storage device.

Referring to FIG. 10, a flow chart 180, illustrates steps performed in connection with a primary storage device providing data to a primary WAN blade coupled thereto.

Processing begins at a first step 182 where a host provides data to the local storage device (the primary storage device). Following the step 182 are two steps 184, 186, which are shown in the flow chart 180 as being able to be performed in parallel. At the step 184, the storage device performs a local write operation to non-volatile memory of the local storage device. In parallel, the storage device may also send a write command to a WAN blade coupled thereto. Following the step 186 is a step 188 where the WAN blade assigns a sequenced number to the data (even though the data has not yet been transferred). Following step 188 is a step 190 where the WAN blade indicates a transfer ready signal back to the local storage device. Following the step 190 are two steps 192, 194 that are shown as being able to be performed in parallel. At the step 192, the storage device acknowledges the write operation to the host. Note that the step 192 may be performed before the storage device has had an opportunity to actually transfer the data to the WAN blade. That is, the storage device may acknowledge the write operation to the host as soon as the WAN blade provides a transfer ready but before the data has actually been transferred from the storage device to the WAN blade. Implementing this functionality may require slight modifications to conventional RDF software operating on the primary storage device.

In parallel with the step 192 is the step 194 where the storage device begins transferring data to the WAN blade. As discussed above, this transfer may take place simultaneously (and/or before or after) with the storage device acknowledging the write to the host. Following the step 194 is a step 196 where the WAN blade transfers to the data to a WAN blade coupled to one or more secondary storage devices This transfer may use, for example, a network. Following the step 196, processing is complete.

The flow chart 180 also shows a step 198 that may be interposed between the steps 188, 190. The step 198 indicates waiting for the sequence number to increment. After the WAN blade assigns a sequence number at the step 188, the WAN blade may wait for the next sequence number (i.e. for the sequence number to increment) before the WAN blade indicates a transfer ready for the data associated with the previous sequence number. The step 198 provides a mechanism to ensure that all of the data associated with a particular sequence number is transferred to the WAN blade before the host receives an acknowledgment that the data has been properly written. Waiting for the next sequence number at the step 198 is discussed in more detail below.

Figure 11:
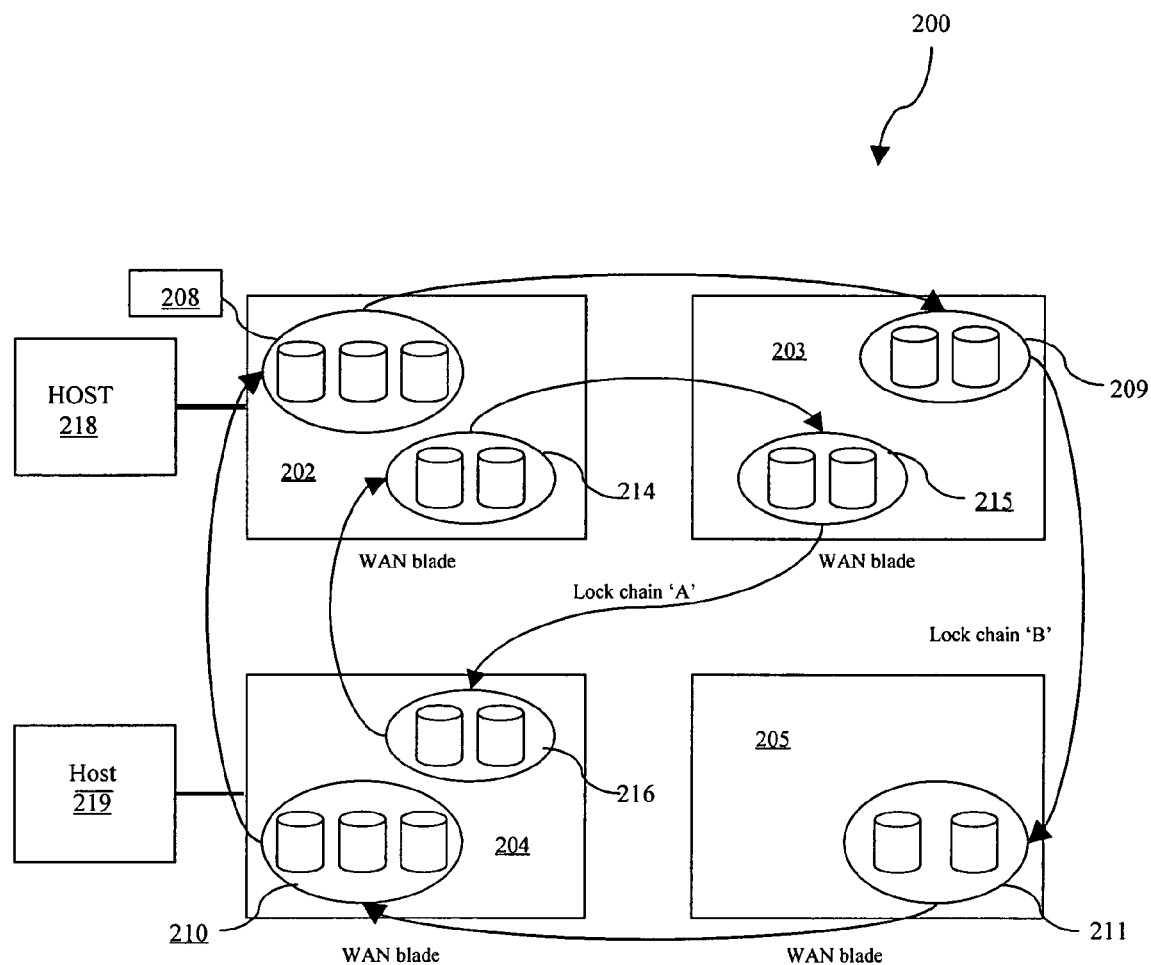
FIG. 11 is a schematic diagram illustrating a consistency group.

Referring to FIG. 11, a system 200 is illustrated as including a plurality of storage devices 202–205 having a first set of WAN blades 208–211 and a second set of WAN blades 214–216. In the diagram of FIG. 11, the WAN blades 208–211, 214–216 are shown as being internal to the storage devices 202–205. However, it may be appreciated by one of ordinary skill in the art that the system 200 may operate with WAN blades being provided external to the storage devices 202–205, WAN blades being provided internal to the storage devices 202–205, or any combination thereof.

The WAN blades 208–211 and the storage devices 202–205 are shown as forming a first consistency group while the WAN blades 214–216 and the storage devices 202–204 are shown as performing a second consistency group. Consistency groups are used to provide a mechanism where data on multiple storage devices may be copied from one of the storage devices that is coupled to the host. That is, in the example of FIG. 11, it is possible for the storage device 202 to be the primary storage device for the consistency group that includes the storage devices 202–205 where a first host 218 is coupled to the storage device 202 that is the primary storage device for the consistency group. For the consistency group corresponding to the WAN blades 214–216, the storage device 204 may be the primary storage device with the storage devices 202, 203 being secondary storage devices, where a second host 219 is coupled to the storage device 204 that is the primary storage device for the consistency group. The two consistency groups shown in FIG. 11 may operate independently. Thus, the storage device 202 may be the primary storage device for one consistency group and a secondary storage device for another consistency group. Similarly, the storage device 204 may be the primary storage device for one consistency group and a secondary storage device for another consistency group.

It is useful for data that is provided by the WAN blade corresponding to the primary storage device to be received by the secondary storage devices in the order that it was provided to the WAN blade coupled to the primary storage device. Thus, for example, if a primary storage device writes data in a sequence corresponding to A, B, C, it is useful if the secondary storage device receives the data in that same order, A, B, C, and not in some other order such as B, A, C. Having the secondary storage device receive the data in the order it was provided by the primary storage device facilitates data recovery, as described in more detail below. Use of the sequence number facilitates writing the data in the correct order.

Figure 12:
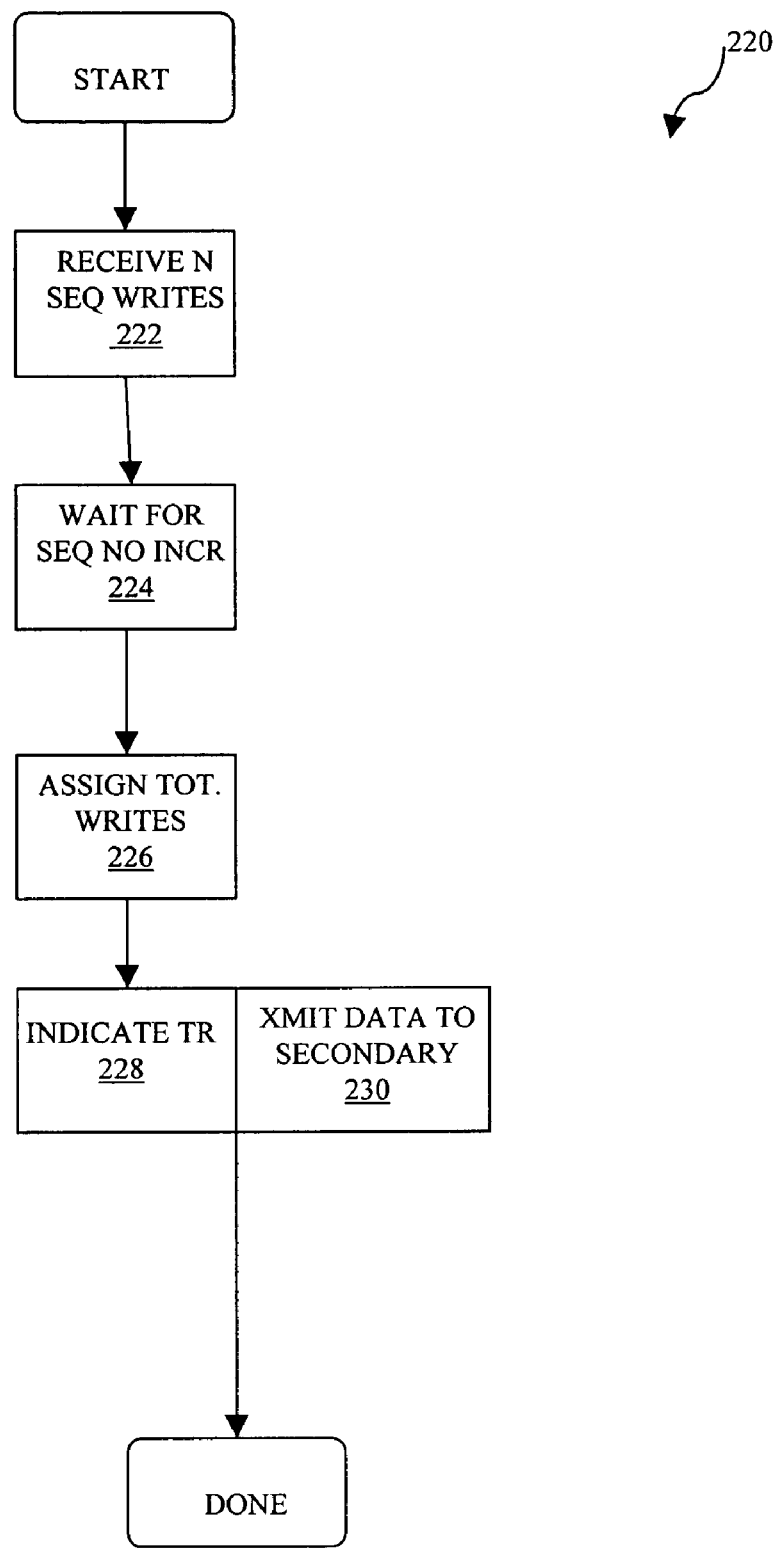
FIG. 12 is a flowchart illustrating steps performed in connection with transferring data from a primary storage device to a WAN blade using a shuttle for sequencing.

Referring to FIG. 12, a flow chart 220, illustrates steps performed in connection with providing data from a primary storage device to a WAN blade coupled thereto in a way that facilitates a corresponding secondary storage device receiving the data in the same order that the data was provided by the primary storage device. Processing begins at a first step 222 where the WAN blade receives the data from the primary storage device and associates the data with a sequence number N. Following the step 222 is a step 224 where the primary storage device waits for the sequence number to increment. A mechanism for changing the sequence number is described in more detail hereinafter.

Following step 224 is a step 226 where, once the sequence number is incremented, the total writes field of all of the data elements associated with the sequence number N (the previous sequence number) is filled in. It is possible to provide the total writes field at the step 226 because, since the sequence number is incremented to N+1, the WAN blade would not expect to receive any more data that would be associated with the sequence number N. Following the step 226 are two steps to 228, 230 that may be performed in parallel. The step 228 corresponds to the WAN blade indicating a transfer ready to the primary storage device. As discussed above, once the WAN blade has indicated a transfer ready to the primary storage device, the primary storage device may acknowledge the write to the host, even though the data has not yet been provided to (or acknowledged by) a secondary storage device. The step 230 corresponds to the WAN blade sending the data to the WAN blade associated with the secondary storage device.

Although there may be many possible techniques for incrementing the sequence number, an embodiment disclosed herein uses a "shuttle" algorithm to increment the sequence number in connection with the ordered writes between the one or more WAN blades associated with the primary storage device and the one or more WAN blades associated with the secondary storage device. A shuttle is a small data structure (or, in other embodiments, possibly a program) that is passed from device to device over the communication links in a round-robin fashion. In the embodiment discussed herein, there is one shuttle that circulates among the WAN blades associated with the primary storage devices of each consistency group and another, separate, shuttle that circulates among the WAN blades associated with the secondary storage devices of each consistency group. Each consistency group has its own set of shuttles. The shuttles carry the sequence number that is used in connection with the ordered writes.

Figure 13:
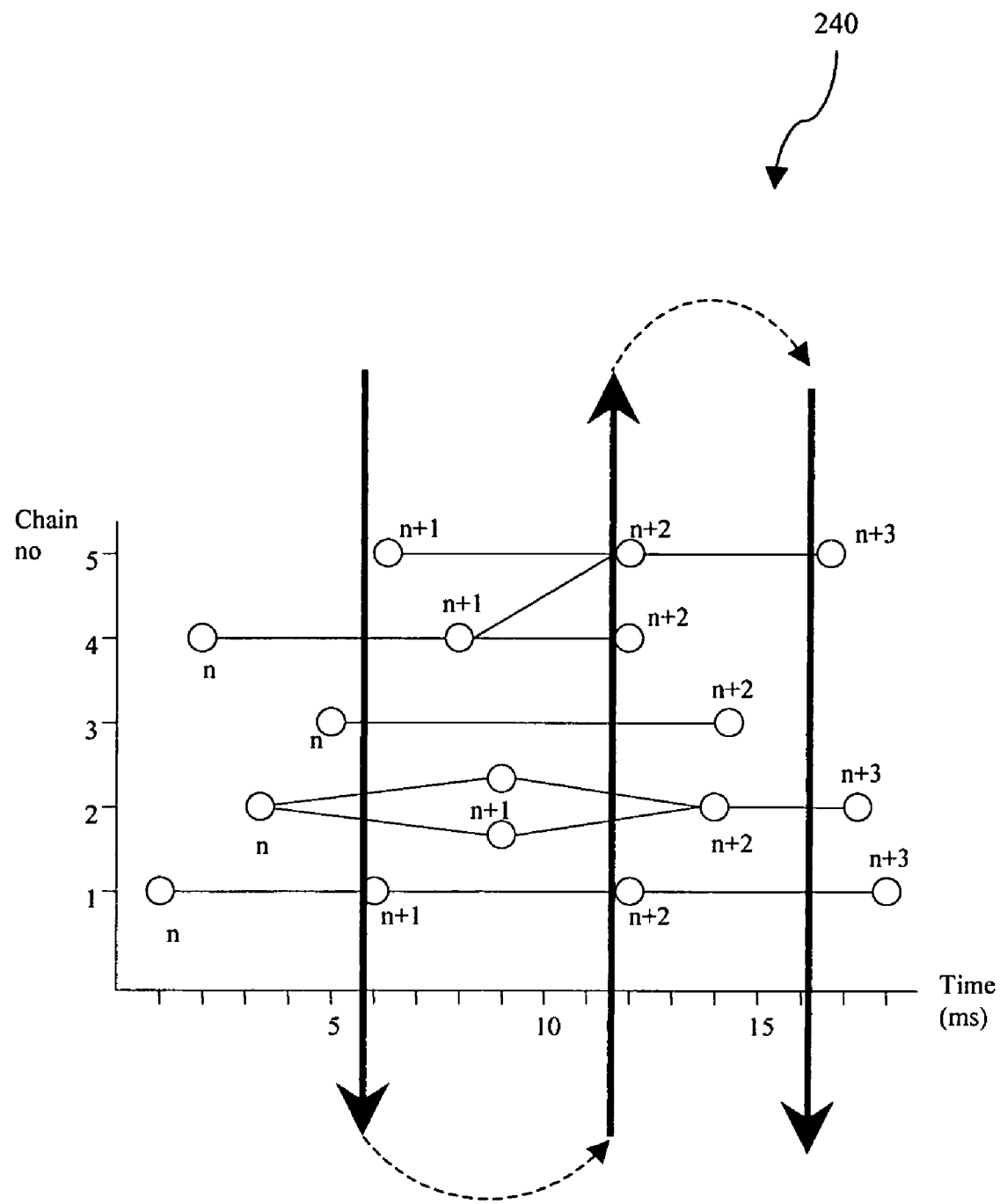
FIG. 13 is a diagram illustrating use of a shuttle in connection with dependent writes from a host to a storage device.

Referring to FIG. 13, a diagram 240 illustrates a relationship between the shuttle and the various chains of dependency set forth in the diagram 145 of FIG. 8. The vertical arrows represent traversal of the shuttle. The labels n, n+1, etc. represent using the shuttle to increment the sequence number. Thus, for example, all of the writes to the left of the first arrow on the left may be assigned sequence number n, all of the writes between the far left arrow and the arrow next to the far left arrow may be assigned sequence number n+1, etc. As shown by the diagram, two writes are assigned different sequence numbers if one of the writes depends from the other (earlier) one of the writes. In this way, newer data is not written to the secondary storage device prior to writing the data from which the newer data depends.

Figure 14:
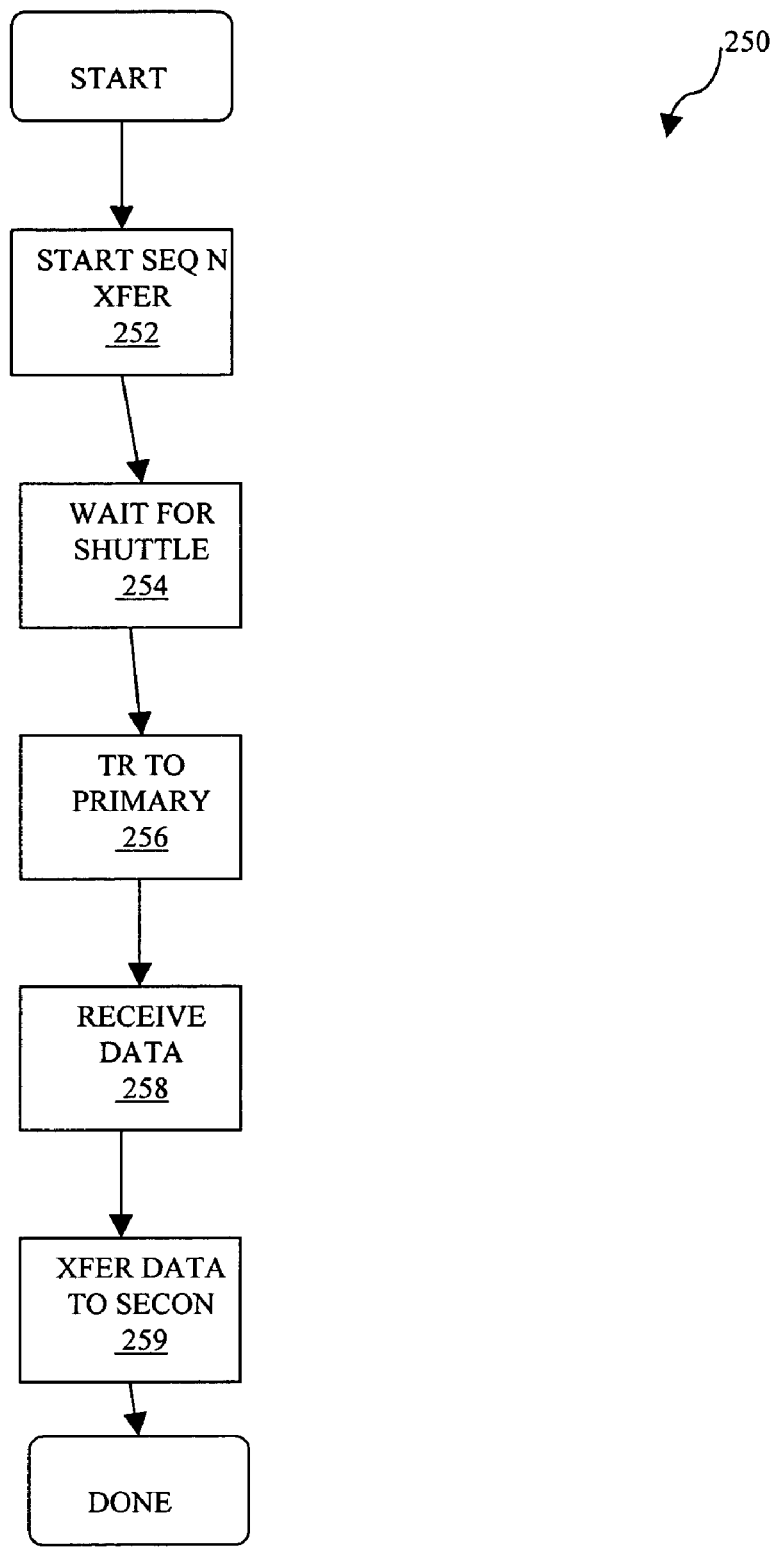
FIG. 14 is a flowchart illustrating steps performed in connection with using a shuttle for sequencing in connection with transferring data from a primary storage device to a WAN blade.

Referring to FIG. 14, a flowchart 250 illustrates steps performed in connection with a WAN blade coupled to a primary storage device receiving data from the storage device and using the shuttle and sequence number to handle the data. Processing begins at a first step 252 where the data is received by the WAN blade from the primary storage device. At the step 252, it is assumed that the common sequence number is N, which is assigned to the data.

Following step 252 is step 254 where the primary WAN blade waits for the shuttle to come around indicating a new sequence number, N+1. Waiting for the new sequence number at the step 254 insures that the WAN blade associated with primary storage device has received all of the data that will be associated with sequence number N.

Following step 254, is step 256 where the WAN blade indicates transfer ready to the primary storage device for all of the data associated with sequence number N. As discussed elsewhere herein, the primary storage device receiving a transfer ready from the WAN blade causes the primary storage device to acknowledge the write to the host, even though the data has yet to be transferred from the primary storage device to the WAN blade (or, for that matter, to a secondary storage device). Sending acknowledgment to the host based on receipt of the transfer ready signal may significantly increase throughput over conventional synchronous RDF. Following step 256 is step 258 where the data is received by the WAN blade from the primary storage device. Following step 258 is step 259 where the data is sent from the WAN blade to one or more WAN blades coupled to secondary storage devices. Following step 259, processing is complete.

In other embodiments, it is possible to increment the sequence number periodically, rather than using a shuttle to rotate among the primary WAN blades coupled to primary storage devices of a consistency group. The time interval between increments may be set according to the amount of time it would take the host to write two successive pieces of data from the same source. That is, if a second write depends on a first write being acknowledged to the host (i.e., a dependent write), there is a minimum amount of time to be expected between the two dependent rights. The time interval for incrementing the sequence number may be set according to the minimum time expected between two dependent writes. Other techniques for incrementing the sequence number are discussed in more detail below.

Figure 15:
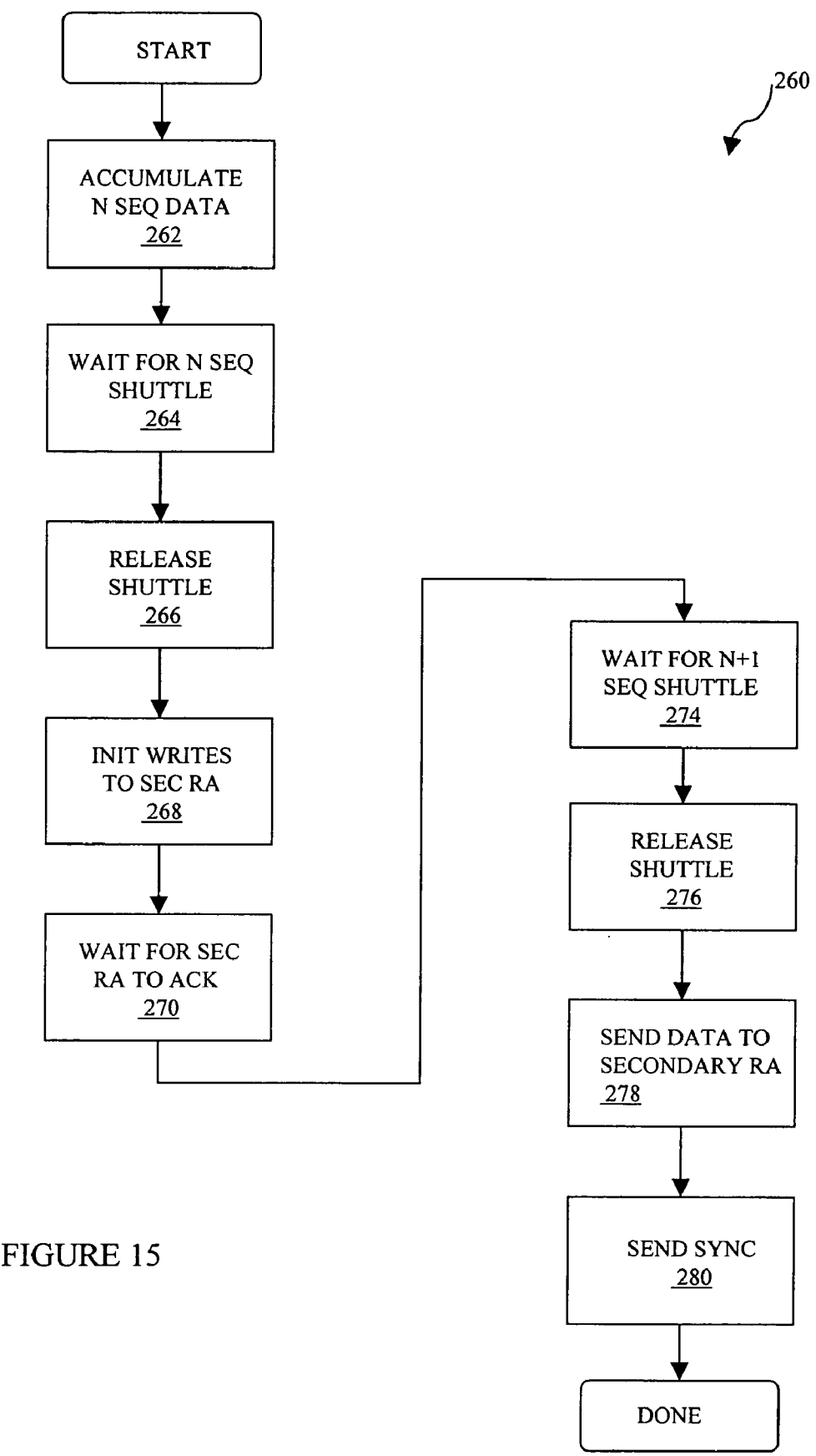
FIG. 15 is a flowchart illustrating steps performed in connection with transferring data from a WAN blade to a secondary storage device using a shuttle for sequencing.

Referring to FIG. 15, a flowchart 260 illustrates steps performed by a WAN blade coupled to a secondary storage device and using the shuttle to handle the transfer of data. Processing begins at the first step, 262, where the WAN blade accumulates (e.g., in the journal) data having sequence number N. Following the step 262 is a step 264 where the WAN blade waits for the shuttle having sequence number N to come around. Following step 264 is step 266 where the WAN blade releases the shuttle (i.e., passes the shuttle to the next WAN blade).

Following step 266 is step 268 where the WAN blade initiates writes to the secondary storage device for all of the data associated with sequence number N. Following step 268 is step 270 where the WAN blade waits for the secondary storage device to acknowledge the initiation of all the writes. Following step 270 is step 274 where the WAN blade waits for the shuttle having sequence number N+1. Following step 274 is step 276 where the WAN blade releases the shuttle. Following step 276 is step 278 where the WAN blade transfers the data associated with sequence number N from the WAN blade to the secondary storage device.

Following the step 278 is a step 280 where the WAN blade coupled to the secondary storage device sends a sync signal back to the WAN blade coupled to the primary storage device (the WAN blade that sent the data). Receipt of the sync signal by the WAN blade that sent the data indicates that the data has been successfully transferred to the secondary storage device. In some embodiments, it is the receipt of the sync signal from each of the WAN blades coupled to the various secondary storage devices that is used by the WAN blade coupled to the primary storage device to set the appropriate bit of the receive bitmap field 162 of the data structure 150. In some embodiments, when the receive bitmap field 162 equals the service bitmap field 156 (indicating that the data has been successfully stored on all of the secondary storage devices of a consistency group), the WAN blade coupled to the primary storage device deletes the journal entries corresponding to the data. Following the step 180, processing is complete.

Note that there are many types of failures that could prevent an RDF consistency group from synchronizing data. When this occurs, the consistency group "triggers", meaning that the secondary storage device(s) are deemed not ready by the primary storage device and any subsequent updates on the primary storage device are marked as invalid on the secondary storage device(s). When the failure is subsequently addressed, data that was marked as invalid during the failure may be copied from the primary storage device to the secondary storage device(s) in connection with normal operation being restored.

Adding the WAN blades and network connections to an RDF consistency group may increase the complexity of handling failures while, at the same time, providing additional options for error recovery. A link failure occurs when any of the communication links fails. A link failure may be detected by failure to receive the shuttle and/or failure of a linked device to respond to a direct inquiry. Note that failure of a link between a WAN blade and its corresponding RA may be unrecoverable, and thus could trigger the consistency group until the link is repaired. On the other hand, a link between WAN blades (for example, across a network) may be handled in a number of ways that do not cause the consistency group to trigger. For example, a temporary failure of a link from a WAN blade coupled to a primary storage device to WAN blade coupled to a secondary storage device may be handled by journaling the writes to the WAN blade of a primary storage device. When this occurs, the primary storage device could still receive acknowledgement from WAN blade coupled thereto. Thus, the WAN blade may be used as a temporary buffer to compensate for network failures.

Of course, once the journal fills up (overflows), the WAN blade of the primary storage device may no longer acknowledge writes by the primary storage device. In addition, in some instances (such as when the journal is stored in volatile memory), it is possible to clear the entire journal in the event that the journal overflows. In connection with clearing the journal, the WAN blade may send messages to the primary storage device to invalidate previously written (and acknowledged) tracks.

Note also that, in some instances, peer-to-peer recovery may be possible. If a first link between devices is down, an affected device could still receive data via some other link, if it exists, and/or could receive the data from some other source, such as another one of the secondaries.

Figure 16:
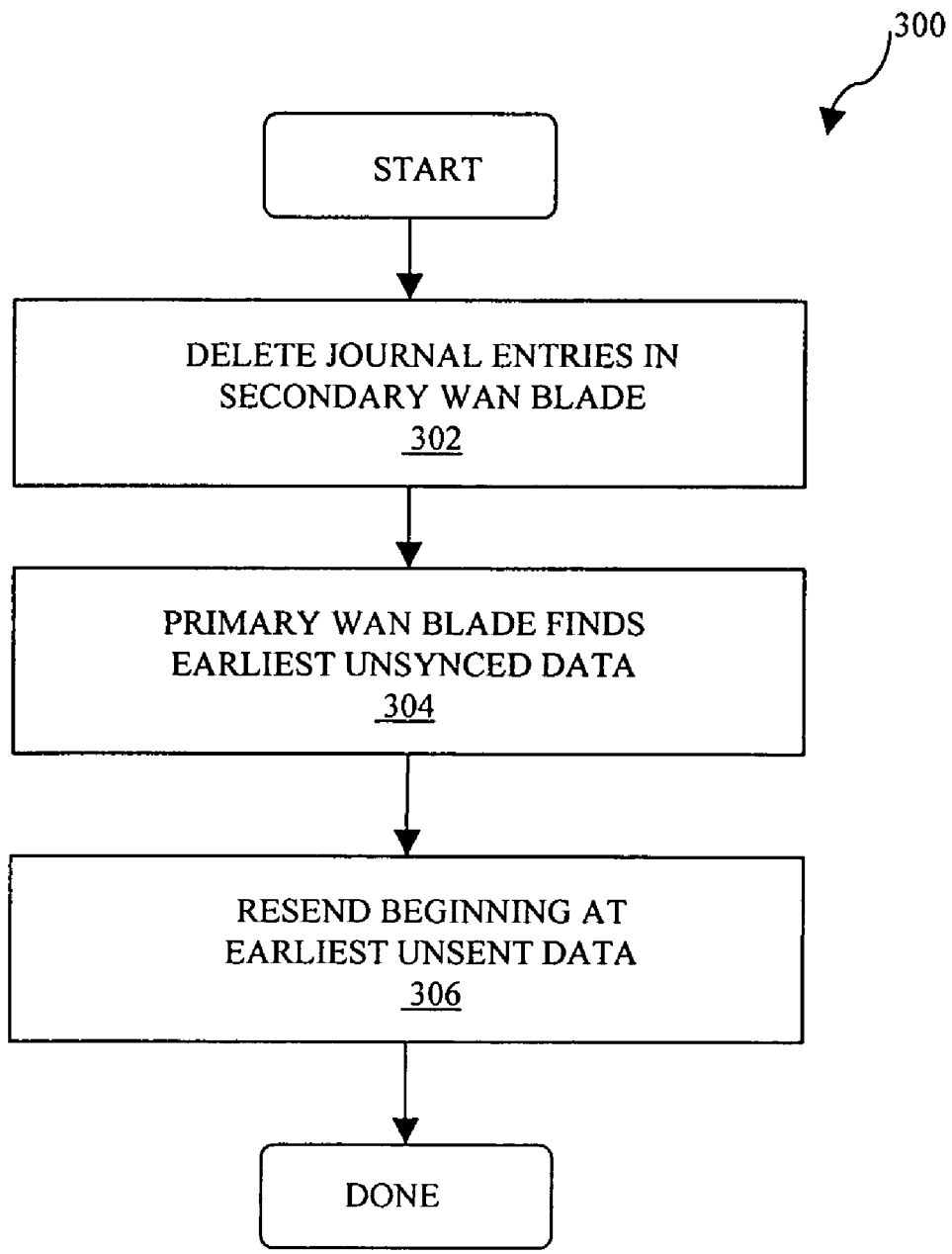
FIG. 16 is a flowchart illustrating steps for recovery in connection with failure in a consistency group.

Referring to FIG. 16, a flow chart 300 illustrates steps performed in connection with data recovery of a consistency group. Data recovery is used in instances where a communication link becomes non-operational or some other portion of the equipment fails. Processing begins at a first step 302 where all data journal entries of all of the WAN blades coupled to secondary storage devices are deleted. Any data stored in a journal corresponding to a secondary storage device has not yet been synchronized, and thus will be resent in connection with data recovery.

Following the step 302 is a step 304 where the WAN blade(s) coupled to the primary storage device search for the earliest journal entries (i.e., journal entries with the lowest sequence number) that have not yet been synchronized. For embodiments where journal entries in the WAN blade coupled to the primary storage device are deleted upon synchronization (e.g., as described above in connection with the step 280 of FIG. 15), then processing at the step 304 simply determines the earliest entries in the journal. Following the step 304 is a step 306 where the WAN blade coupled to the primary storage device proceeds with recovery by resending data starting from the earliest journal entries determined at the step 304. Following the step 306, processing is complete.

Figure 17:
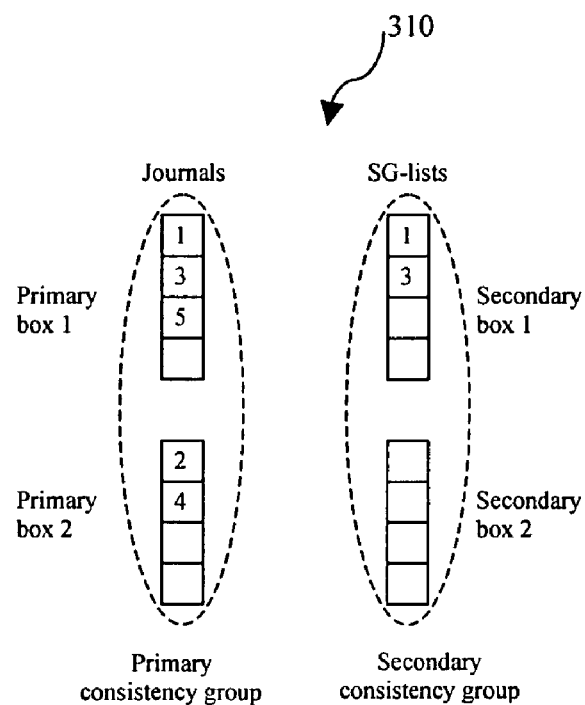
FIG. 17 is a diagram illustrating implementation of delayed journal deletion and recovery.

Referring to FIG. 17, a diagram 310 illustrates distribution of journal entries. The label "SG-lists" refers to journals on the WAN blade corresponding to the secondary storage device. In the example of the diagram 310, only journal entries 1 and 3 have been propagated to the secondary storage device. Thus, if the consistency group triggers, the WAN blade corresponding to secondary box one will delete journal entry 3 since journal entry 2 is not present. Note that the primary WAN blade should be able to resend journal entry 2, which should not have been acknowledged by the WAN blade corresponding to the secondary storage device, and thus should not have been deleted yet from the journal of the WAN blade corresponding to the primary storage device.

Figure 18:
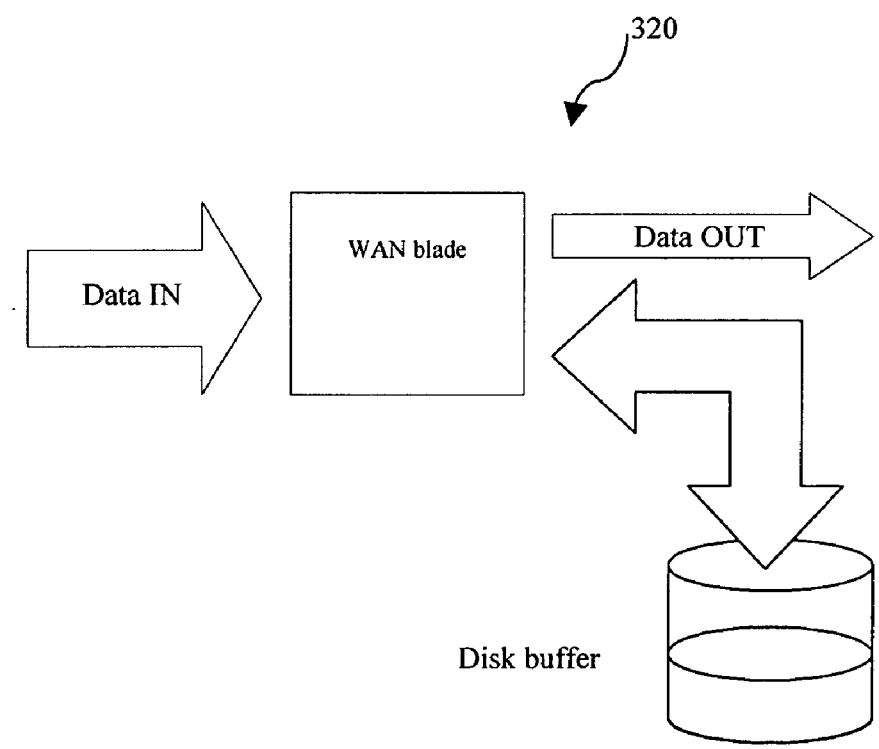
FIG. 18 is a diagram illustrating an effect of using a journal (disk buffer) with a WAN blade.

Referring to FIG. 18, a diagram 320 illustrates a WAN blade using a Disk buffer (i.e., journal) to handle different maximum throughput rates with respect to data provided to the WAN blade from the corresponding storage device (e.g., Data IN) and data provided from the WAN blade to other WAN blades via, for example, a network (e.g., Data OUT). The Disk buffer may be used to temporarily store any data provided to the WAN blade that can not be immediately sent from the WAN blade.

In some instances, an application may repair files that are incomplete due to any one of a variety of unforeseen circumstances, such as a system crash. However, often the ability to repair incomplete files relies, at least in part, on the data being written to the file in the order that the data was provided by the application. That is, if an application writes block 1, block 2, and then block 3 to a file, the application may be able to repair the file if the system crashes at any time during the process. An example of such an application is a database. However, the application may have difficulty repairing a file if data is written to the file in a different order than the data had been provided by the application. For example, if an application writes block 1, block 2, and then block 3, in that order, the application may have difficulty repairing a file if, for some reason, the file storage system writes block 2, block 3, and then block 1, in that order.

As discussed above, it is sometime useful to restart an application on a host coupled to a storage device that was previously a secondary storage device but which is subsequently converted to a primary storage device. However, in such instances, the application may have to repair files in which a multiblock write operation was interrupted by the event or events that created the situation where the application needed to be restarted on the secondary storage device. In such cases, it is useful to have ordered writes where data has been provided to the secondary storage device in the same order that the data was written by the application. Having the order writes increases the likelihood that any partially written files may be repaired by the application.

In another situation, called cascaded RDF, a primary storage device provides data to a first secondary storage device using synchronous mode where every write by the host to the primary storage device is acknowledged only after the data has been successfully transferred to the first secondary storage device. The first secondary storage device is located relatively geographically close to the primary storage device to facilitate synchronous communication between the two. A second secondary storage device is coupled to the first secondary storage device using semi-synchronous RDF so that the two secondary storage devices may be geographically separated. Thus, a catastrophic failure may damage both the primary storage device and the first secondary storage device (which are relatively close to facilitate synchronous RDF communication), but leave the second secondary storage device unharmed. Note, however, that the WAN blade discussed herein may replace the first secondary storage device. Thus, the primary storage device would provide data to the WAN blade which would provide data to the (geographically separate) secondary storage device, thus addressing the previous need for two secondary storage devices in a cascaded RDF configuration.

Figure 19A:
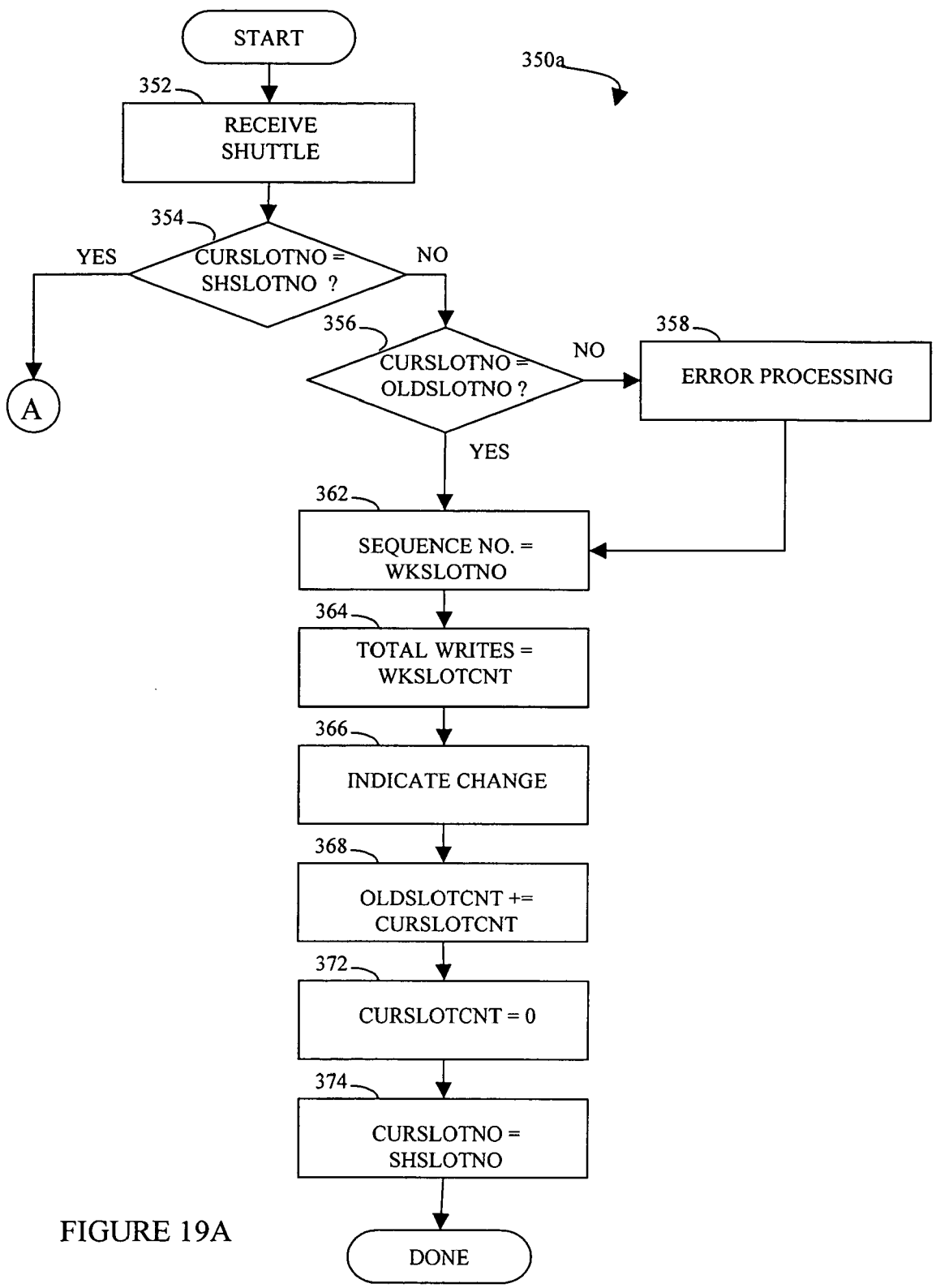
FIGS. 19A and 19B are a flow chart illustrating steps performed in connection with an alternative embodiment for updating the shuttle.
Figure 19B:
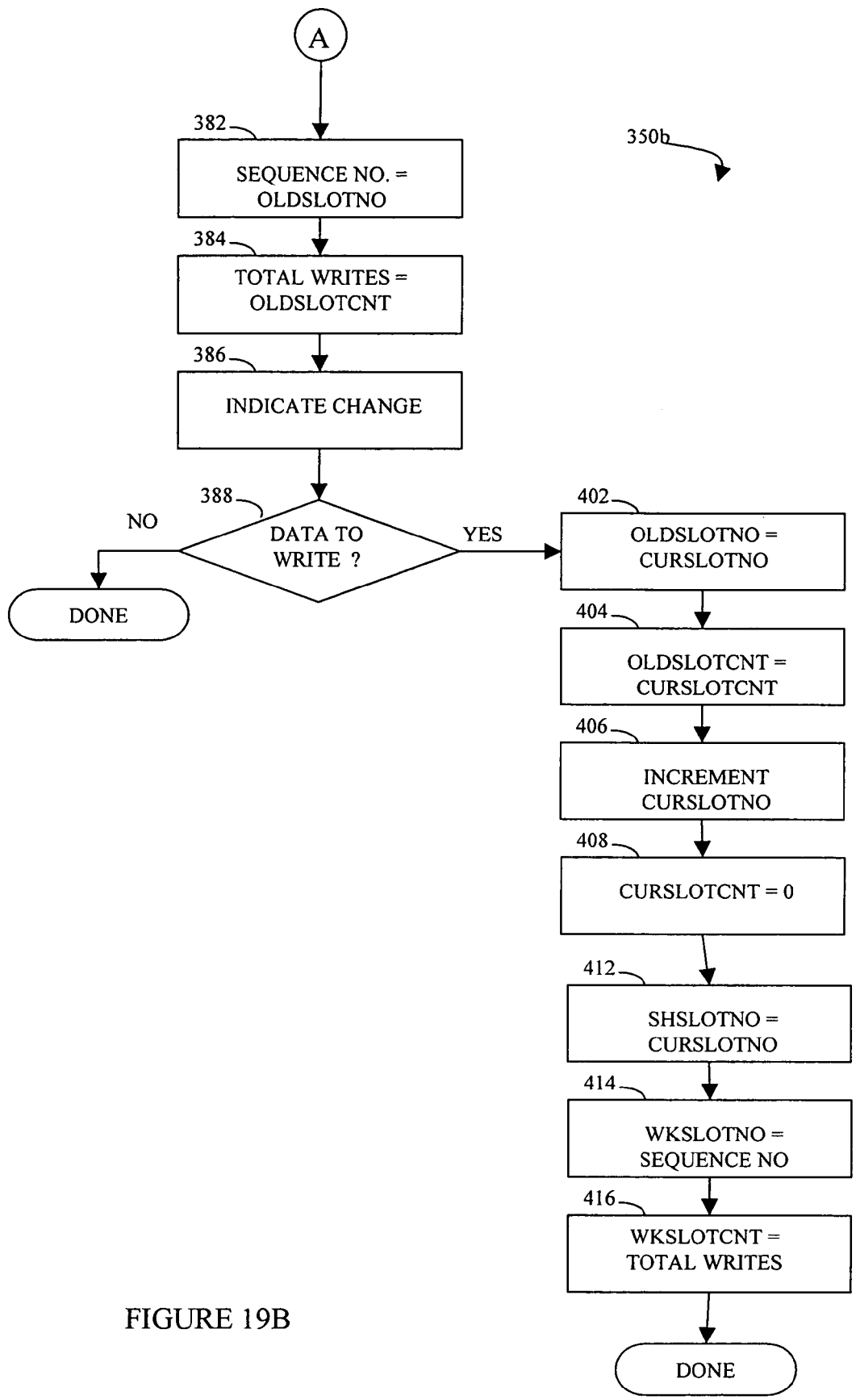

Referring to FIGS. 19A and 19B, a flow chart 350a, 350b, illustrates steps performed by a device that transfers data in connection with an alternative embodiment for updating the sequence number used to handle ordered writes of SRDF data. The alternative embodiment uses a shuttle. However, the mechanism for updating the sequence number associated with the shuttle is different in the alternative embodiment.

Processing begins at a first step 352 where the shuttle is received. In the embodiment illustrated in connection with the flow chart 350a, 350b, the shuttle has a number of variables associated therewith including a shuttle slot number variable (SHSLOTNO), an old slot number variable (OLDSLOTNO), an old slot number count of the amount of data associated with the OLDSLOTNO (OLDSLOTCNT), a well-known slot number (WKSLOTNO), and a well-known slot count (WKSLOTCNT). The well-known variables are known throughout the consistency group, as described below.

Similarly, each entity in the consistency group that receives the shuttle (e.g., a WAN blade) uses a current slot number variable (CURSLOTNO), and a current slot number count (CURSLOTCNT). In addition, the sequence number and total writes variables are also used for this embodiment. The sequence number and total writes variables used in connection with transferring data are described elsewhere herein. See, for example, FIG. 9 and the corresponding text, above.

In the alternative embodiment, the shuttle is passed around to each node that is transferring data (e.g., each WAN blade). When a node receives the shuttle, the node first determines if the sequence number associated with the shuttle (SHSLOTNO) is the same as the local current sequence number held by the node (CURSLOTNO). If so, and if the node has data to transmit, then the node increments the sequence number of the shuttle. Otherwise, if the node has no data to transmit, the sequence number is not incremented, thus preventing the situation where there is no data associated with one or more sequence numbers. In addition, the alternative embodiment is more peer-to-peer than the previous embodiment since any of the nodes in the consistency group may update the sequence number for the shuttle. Thus, the alternative embodiment does not rely on any one node or subset of nodes of the consistency group to handle updating the sequence number. Instead, for the alternative embodiment, any node of the consistency group may update the sequence number.

Following the step 352 is a test step 354 where it is determined if the current local slot number stored at the node (CURSLOTNO) that has received the shuttle equals the shuttle slot number (SHSLOTNO). If not, then control passes from the step 354 to the step 356 where it is determined if the local current slot number (CURSLOTNO) equals the old slot number of the shuttle (OLDSLOTNO). If not, then control passes from the step 356 to a step 358 where error processing is performed. Note that the local current slot number is expected to equal either the current shuttle slot number or the old shuttle slot number in normal operation. Said differently, each node should see each shuttle slot number in normal operation. The error processing performed at the step 358 can be any conventional error processing including posting a message or, in some instances, causing an exception to occur.

If it is determined at the test step 356 that the current local slot number (CURSLOTNO) equals the old slot number stored with the shuttle (OLDSLOTNO), then control passes from the step 356 to a step 362 where the sequence number that is local to the node (SEQUENCENO) is set equal to the well known sequence number that is part of the shuttle (WKSLOTNO). Following the step 362 is a step 364 where the total writes variable (TOTAL WRITES) is set equal to the well known slot count variable (WKSLOTCNT) of the shuttle. The steps 362, 364 represent updating the sequence number and the total writes variables in order to facilitate transmitting data from the node to the remote counterpart of the node. In other words, once the sequence number and the corresponding total writes values have been set at the steps 362, 364, the node may transmit to the remote storage device (or corresponding WAN blade) any data that is associated with the sequence number set at the step 362. This is represented by a step 366 that follows the step 364 where setting of the sequence number is signaled to other parts of the system that transmit data from the local storage device (or WAN blade) to the remote storage device (or corresponding WAN blade).

Following the step 366 is a step 368 where the old slot count variable associated with the shuttle (OLDSLOTCNT) is incremented by an amount equal to the value of the local current slot count variable (CURSLOTCNT). The local current slot count represents the amount of data collected by the node under the local current slot number. As discussed above, the local current slot number for the node equals the old slot number for the shuttle (unless an error has occurred). At the step 368, the count of data associated with the old slot number of the shuttle is incremented by the amount of data collected at the local node and associated with the slot number. Following step 368 is a step 372 where the current slot count variable is set to zero (i.e., is reset). Following the step 372 is a step 374 where the current slot number variable (CURSLOTNO) is updated to be equal to the shuttle slot number variable (SHSLOTNO). Following the step 374, processing is complete.

If it is determined that at the test step 354 that the local current slot number is equal to the shuttle slot number, then control passes from the step 354 to a step 382 where the local sequence number (SEQUENCENO) is set equal to the old slot number variable of the shuttle (OLDSLOTNO). Note the off-page connector A in the flow chart 350a of FIG. 19A and the flow chart 350b of FIG. 19B. Following the step 382 is a step 384 where the total writes variable (TOTAL WRITES) is set equal to the old slot count variable of the shuttle (OLDSLOTCNT). The steps 382, 384 represent updating the sequence number and total writes variables possibly requiring transmission of data to the remote storage device. Accordingly, following the step 384 is a step 386 where the change in the sequence number and total writes variables is signaled to the rest of the system to cause transmission of the data associated with the sequence number.

Following the step 386 is a test step 388 which determines if there is data to be written by the local node. If not, then processing is complete. Otherwise, control transfers to the step 402 where the old slot number associated with the shuttle (OLDSLOTNO) is set equal to the local current slot number (CURSLOTNO), which is also the shuttle slot number by virtue of the test at the step 354. Following the step 402 is a step 404 where the old slot count variable (OLDSLOTCNT) is set equal to the local current slot count variable (CURSLOTCNT). Following the step 404 is a step 406 where the current slot number variable (CURSLOTNO) is incremented. Following the step 406 is a step 408 where the current slot count variable (CURSLOTCNT) is set equal to zero.

Following step 408 is a step 412 where the shuttle slot number (SHSLOTNO) is set equal to the local current slot number variable (CURSLOTNO). Following step 412 is a step 414 where the well known slot number variable of the shuttle (WKSLOTNO) is set equal to the local current sequence number (SEQUENCENO). Following the step 414 is a step 416 where the well known slot count variable of the shuttle (WKSLOTCNT) is set equal to the local total writes variable of the node (TOTAL WRITES). Following step 416, processing is complete.

While the invention has been disclosed in connection with various embodiments, modifications thereon will be readily apparent to those skilled in the art. Accordingly, the spirit and scope of the invention is set forth in the following claims.

What is claimed is:

1. A method for transferring data from at least one local data storage device to at least one remote data storage device, comprising:
   subdividing the data into portions;
   assigning a sequence number to each of the portions, wherein there is a first set of writes to the at least one local storage device for a first set of portions having a first sequence number and the first set of writes is begin before a second set of writes for a second set of portions having a second sequence number that is assigned after to the first sequence number; and
   updating the sequence number in response to a particular sequence number having been used before and in response to data being available to send from the at least one local storage device to the at least one remote storage device.

2. A method, according to claim 1, wherein the at least one local storage device is part of a group of storage devices that form a consistency group.

3. A method, according to claim 2, further comprising:
   passing a shuttle between the group of storage devices that form the consistency group; and
   using the shuttle to determine if a particular sequence number has been used before.

4. A method, according to claim 3, wherein updating the sequence number includes a particular one of the storage devices of the consistency group using the shuttle to determine if the particular one of the storage devices has used the particular sequence number before and, if so, the particular one of the storage devices updating the sequence number in response to the particular one of the storage devices having data to be sent to the at least one remote storage device.

5. A method, according to claim 1, further comprising:
   maintaining a running total of an amount of data associated with each of the sequence numbers.

6. A method, according to claim 5, wherein the at least one local storage device is part of a group of storage devices that form a consistency group.

7. A method, according to claim 6, further comprising:
   passing a shuttle between the storage devices of the consistency group; and
   using the shuttle for maintaining the running total of data associated with each of the sequence numbers.

8. A method, according to claim 7, wherein updating the sequence number includes a particular one of the storage devices of the consistency group using the shuttle to determine if the particular one of the storage devices has used the particular sequence number before and, if so, the particular one of the storage devices updating the sequence number in response to the particular one of the storage devices having data to be sent to the at least one remote storage device.

9. A method, according to claim 8, further comprising:
   following updating the sequence number, transferring data having a previous sequence number from the at least one local storage device to the at least one remote storage device.

10. A method, according to claim 9, further comprising:
    prior to transferring data, buffering the data in an auxiliary storage area associated with the at least one local storage device.

11. A computer program product, provided in a computer-readable storage medium, that transfers data from at least one local data storage device to at least one remote data storage device, comprising:

executable code, provided in the computer-readable storage medium that maintains the data subdivided into portions;

executable code, provided in the computer-readable storage medium that assigns a sequence number to each of the portions, wherein there is a first set of writes to the at least one local storage device for a first set of portions having a first sequence number and the first set of writes is begun before a second set of writes for a second set of portions having a second sequence number that is assigned after to the first sequence number; and executable code provided in the computer-readable storage medium, that updates the sequence number in response to a particular sequence number having been used before and in response to data being available to send from the at least one local storage device to the at least one remote storage device.

12. A computer program product, according to claim 11, wherein the at least one local storage device is part of a group of storage devices that form a consistency group.

13. A computer program product, according to claim 12, further comprising:

executable code, provided in the computer-readable storage medium, that passes a shuttle between the storage devices of the consistency group; and executable code, provided in the computer-readable storage medium, that uses the shuttle to determine if a particular sequence number has been used before.

14. A computer program product, according to claim 13, wherein executable code that updates the sequence number includes executable code that causes a particular one of the storage devices of the consistency group using the shuttle to determine if the particular one of the storage devices has used the particular sequence number before and, if so, causes the particular one of the storage devices to update the sequence number in response to the particular one of the storage devices having data to be sent to the at least one remote storage device.

15. A computer program product, according to claim 11, further comprising:

executable code, provided in the computer-readable storage medium, that maintains a running total of an amount of data associated with each of the sequence numbers.

16. A computer program product, according to claim 15, wherein the at least one local storage device is part of a group of storage devices that form a consistency group.

17. A computer program product, according to claim 16, further comprising:

executable code, provided in the computer-readable storage medium, that passes a shuttle between the storage devices of the consistency group; and executable code, provided in the computer-readable storage medium, that uses the shuttle for maintaining the running total of data associated with each of the sequence numbers.

18. A computer program product, according to claim 17, wherein executable code that updates the sequence number includes executable code that causes a particular one of the storage devices of the consistency group using the shuttle to determine if the particular one of the storage devices has used the particular sequence number before and, if so, causes the particular one of the storage devices updating the sequence number in response to the particular one of the storage devices having data to be sent to the at least one remote storage device.

19. A computer program product, according to claim 18, further comprising:

executable code, provided in the computer-readable storage medium, that transfers data having a previous sequence number from the at least one local storage device to the at least one remote storage device following updating the sequence number.

20. A computer program product, according to claim 19, further comprising:

executable code, provided in the computer-readable storage medium, that buffers the data in an auxiliary storage area associated with the at least one local storage device prior to transferring data.

* * * * *